(12) United States Patent
Bhargava et al.

(10) Patent No.: US 9,075,993 B2
(45) Date of Patent: Jul. 7, 2015

(54) SYSTEM AND METHOD FOR SELECTIVELY GROUPING AND MANAGING PROGRAM FILES

(75) Inventors: Rishi Bhargava, Cupertino, CA (US);
David P. Reese, Jr., Sunnyvale, CA (US)

(73) Assignee: McAfee, Inc., Santa Clara, CA (US)

( * ) Notice: Subject to any disclaimer, the term of this patent is extended or adjusted under 35 U.S.C. 154(b) by 1126 days.

(21) Appl. No.: 13/012,138

(22) Filed: Jan. 24, 2011

(65) Prior Publication Data

US 2013/0246423 A1 Sep. 19, 2013

(51) Int. Cl.
*G06F 21/56* (2013.01)
*G06F 17/30* (2006.01)
*H04L 29/06* (2006.01)

(52) U.S. Cl.
CPC ................ *G06F 21/56* (2013.01); *G06F 17/30* (2013.01); *H04L 63/1433* (2013.01); *H04L 63/145* (2013.01)

(58) Field of Classification Search
CPC ... G06F 11/3688; G06F 17/24; G06F 17/273; G06F 19/321; G06F 21/563; G06F 2201/83; G06F 11/22; G06F 11/2273; G06F 11/2294; G06F 11/2736; G06F 11/32; G06F 19/12; G06F 19/324; G06F 19/363; G06F 21/56; G06F 21/577; G06F 21/57; G06F 21/50; H04L 63/145
USPC .......................................................... 707/737
See application file for complete search history.

(56) References Cited

U.S. PATENT DOCUMENTS 4,688,169 A 8/1987 Joshi
4,982,430 A 1/1991 Frezza et al.
(Continued)

FOREIGN PATENT DOCUMENTS

EP 1 482 394 A2 12/2004
EP 2 037 657 A1 3/2009
(Continued)

OTHER PUBLICATIONS

"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).
(Continued)

*Primary Examiner* — Jason Liao
*Assistant Examiner* — Jesse P Frumkin
(74) *Attorney, Agent, or Firm* — Patent Capital Group

(57) ABSTRACT

A method in one embodiment includes determining a frequency range corresponding to a subset of a plurality of program files on a plurality of hosts in a network environment. The method also includes generating a first set of counts including a first count that represents an aggregate amount of program files in a first grouping of one or more program files of the subset, where each of the one or more program files of the first grouping includes a first value of a primary attribute. In specific embodiments, each program file is unknown. In further embodiments, the primary attribute is one of a plurality of file attributes provided in file metadata. Other specific embodiments include either blocking or allowing execution of each of the program files of the first grouping. More specific embodiments include determining a unique identifier corresponding to at least one program file of the first grouping.

16 Claims, 10 Drawing Sheets

(56) References Cited

U.S. PATENT DOCUMENTS

| | | | |
|---|---|---|---|
| 5,155,847 A | 10/1992 | Kirouac et al. | |
| 5,222,134 A | 6/1993 | Waite et al. | |
| 5,390,314 A | 2/1995 | Swanson | |
| 5,521,849 A | 5/1996 | Adelson et al. | |
| 5,560,008 A | 9/1996 | Johnson et al. | |
| 5,699,513 A | 12/1997 | Feigen et al. | |
| 5,778,226 A | 7/1998 | Adams et al. | |
| 5,778,349 A | 7/1998 | Okonogi | |
| 5,787,427 A | 7/1998 | Benantar et al. | |
| 5,842,017 A | 11/1998 | Hookway et al. | |
| 5,907,709 A | 5/1999 | Cantey et al. | |
| 5,907,860 A | 5/1999 | Garibay et al. | |
| 5,926,832 A | 7/1999 | Wing et al. | |
| 5,974,149 A | 10/1999 | Leppek | |
| 5,987,610 A | 11/1999 | Franczek et al. | |
| 5,987,611 A | 11/1999 | Freund | |
| 5,991,881 A | 11/1999 | Conklin et al. | |
| 6,064,815 A | 5/2000 | Hohensee et al. | |
| 6,073,142 A | 6/2000 | Geiger et al. | |
| 6,141,698 A | 10/2000 | Krishnan et al. | |
| 6,192,401 B1 | 2/2001 | Modiri et al. | |
| 6,192,475 B1 | 2/2001 | Wallace | |
| 6,256,773 B1 | 7/2001 | Bowman-Amuah | |
| 6,275,938 B1 | 8/2001 | Bond et al. | |
| 6,321,267 B1 | 11/2001 | Donaldson | |
| 6,338,149 B1 | 1/2002 | Ciccone, Jr. et al. | |
| 6,356,957 B2 | 3/2002 | Sanchez, II et al. | |
| 6,393,465 B2 | 5/2002 | Leeds | |
| 6,442,686 B1 | 8/2002 | McArdle et al. | |
| 6,449,040 B1 | 9/2002 | Fujita | |
| 6,453,468 B1 | 9/2002 | D'Souza | |
| 6,460,050 B1 | 10/2002 | Pace et al. | |
| 6,587,877 B1 | 7/2003 | Douglis et al. | |
| 6,611,925 B1 | 8/2003 | Spear | |
| 6,662,219 B1 | 12/2003 | Nishanov et al. | |
| 6,748,534 B1 | 6/2004 | Gryaznov et al. | |
| 6,769,008 B1 | 7/2004 | Kumar et al. | |
| 6,769,115 B1 | 7/2004 | Oldman | |
| 6,795,966 B1 | 9/2004 | Lim et al. | |
| 6,832,227 B2 | 12/2004 | Seki et al. | |
| 6,834,301 B1 | 12/2004 | Hanchett | |
| 6,847,993 B1 | 1/2005 | Novaes et al. | |
| 6,907,600 B2 | 6/2005 | Neiger et al. | |
| 6,918,110 B2 | 7/2005 | Hundt et al. | |
| 6,930,985 B1 | 8/2005 | Rathi et al. | |
| 6,934,755 B1 | 8/2005 | Saulpaugh et al. | |
| 6,988,101 B2 | 1/2006 | Ham et al. | |
| 6,988,124 B2 | 1/2006 | Douceur et al. | |
| 7,007,302 B1 | 2/2006 | Jagger et al. | |
| 7,010,796 B1 | 3/2006 | Strom et al. | |
| 7,024,548 B1 | 4/2006 | O'Toole, Jr. | |
| 7,039,949 B2 | 5/2006 | Cartmell et al. | |
| 7,065,767 B2 | 6/2006 | Kambhammettu et al. | |
| 7,069,330 B1 | 6/2006 | McArdle et al. | |
| 7,082,456 B2 | 7/2006 | Mani-Meitav et al. | |
| 7,093,239 B1 | 8/2006 | van der Made | |
| 7,124,409 B2 | 10/2006 | Davis et al. | |
| 7,139,916 B2 | 11/2006 | Billingsley et al. | |
| 7,152,148 B2 | 12/2006 | Williams et al. | |
| 7,159,036 B2 | 1/2007 | Hinchliffe et al. | |
| 7,177,267 B2 | 2/2007 | Oliver et al. | |
| 7,203,864 B2 | 4/2007 | Goin et al. | |
| 7,251,655 B2 | 7/2007 | Kaler et al. | |
| 7,290,266 B2 | 10/2007 | Gladstone et al. | |
| 7,302,558 B2 | 11/2007 | Campbell et al. | |
| 7,330,849 B2 | 2/2008 | Gerasoulis et al. | |
| 7,346,781 B2 | 3/2008 | Cowle et al. | |
| 7,349,931 B2 | 3/2008 | Horne | |
| 7,350,204 B2 | 3/2008 | Lambert et al. | |
| 7,353,501 B2 | 4/2008 | Tang et al. | |
| 7,363,022 B2 | 4/2008 | Whelan et al. | |
| 7,370,360 B2 | 5/2008 | van der Made | |
| 7,406,517 B2 | 7/2008 | Hunt et al. | |
| 7,441,265 B2 | 10/2008 | Staamann et al. | |
| 7,464,408 B1 | 12/2008 | Shah et al. | |
| 7,506,155 B1 | 3/2009 | Stewart et al. | |
| 7,506,170 B2 | 3/2009 | Finnegan | |
| 7,506,364 B2 | 3/2009 | Vayman | |
| 7,546,333 B2 | 6/2009 | Alon et al. | |
| 7,546,594 B2 | 6/2009 | McGuire et al. | |
| 7,552,479 B1 | 6/2009 | Conover et al. | |
| 7,577,995 B2 | 8/2009 | Chebolu et al. | |
| 7,603,552 B1 | 10/2009 | Sebes et al. | |
| 7,607,170 B2 | 10/2009 | Chesla | |
| 7,657,599 B2 | 2/2010 | Smith | |
| 7,669,195 B1 | 2/2010 | Qumei | |
| 7,685,635 B2 | 3/2010 | Vega et al. | |
| 7,698,744 B2 | 4/2010 | Fanton et al. | |
| 7,703,090 B2 | 4/2010 | Napier et al. | |
| 7,757,269 B1 | 7/2010 | Roy-Chowdhury et al. | |
| 7,765,538 B2 | 7/2010 | Zweifel et al. | |
| 7,783,735 B1 | 8/2010 | Sebes et al. | |
| 7,809,704 B2 | 10/2010 | Surendran et al. | |
| 7,818,377 B2 | 10/2010 | Whitney et al. | |
| 7,823,148 B2 | 10/2010 | Deshpande et al. | |
| 7,836,504 B2 | 11/2010 | Ray et al. | |
| 7,840,968 B1 | 11/2010 | Sharma et al. | |
| 7,849,507 B1 | 12/2010 | Bloch et al. | |
| 7,856,661 B1 | 12/2010 | Sebes et al. | |
| 7,865,931 B1 | 1/2011 | Stone et al. | |
| 7,870,387 B1 | 1/2011 | Bhargava et al. | |
| 7,873,955 B1 | 1/2011 | Sebes et al. | |
| 7,895,573 B1 | 2/2011 | Bhargava et al. | |
| 7,908,653 B2 | 3/2011 | Brickell et al. | |
| 7,937,334 B2 | 5/2011 | Bonissone et al. | |
| 7,937,455 B2 | 5/2011 | Saha et al. | |
| 7,966,659 B1 | 6/2011 | Wilkinson et al. | |
| 7,987,230 B2 | 7/2011 | Sebes et al. | |
| 7,996,836 B1 | 8/2011 | McCorkendale et al. | |
| 8,015,388 B1 | 9/2011 | Rihan et al. | |
| 8,015,563 B2 | 9/2011 | Araujo et al. | |
| 8,195,931 B1 | 6/2012 | Sharma et al. | |
| 8,234,713 B2 | 7/2012 | Roy-Chowdhury et al. | |
| 8,291,497 B1* | 10/2012 | Griffin et al. | 726/23 |
| 8,306,988 B1* | 11/2012 | Jyoti et al. | 707/754 |
| 8,307,437 B2 | 11/2012 | Sebes et al. | |
| 8,321,932 B2 | 11/2012 | Bhargava et al. | |
| 8,332,929 B1 | 12/2012 | Bhargava et al. | |
| 8,341,627 B2 | 12/2012 | Mohinder | |
| 8,352,930 B1 | 1/2013 | Sebes et al. | |
| 8,381,284 B2 | 2/2013 | Dang et al. | |
| 8,495,060 B1* | 7/2013 | Chang | 707/723 |
| 8,515,075 B1 | 8/2013 | Saraf et al. | |
| 8,539,063 B1 | 9/2013 | Sharma et al. | |
| 8,544,003 B1 | 9/2013 | Sawhney et al. | |
| 8,549,003 B1 | 10/2013 | Bhargava et al. | |
| 8,549,546 B2 | 10/2013 | Sharma et al. | |
| 8,555,404 B1 | 10/2013 | Sebes et al. | |
| 8,561,051 B2 | 10/2013 | Sebes et al. | |
| 8,561,082 B2 | 10/2013 | Sharma et al. | |
| 8,572,007 B1* | 10/2013 | Manadhata et al. | 706/12 |
| 8,615,502 B2 | 12/2013 | Saraf et al. | |
| 8,621,233 B1* | 12/2013 | Manadhata et al. | 713/188 |
| 8,701,182 B2 | 4/2014 | Bhargava et al. | |
| 8,701,189 B2 | 4/2014 | Saraf et al. | |
| 8,707,422 B2 | 4/2014 | Bhargava et al. | |
| 2002/0056076 A1 | 5/2002 | van der Made | |
| 2002/0069367 A1 | 6/2002 | Tindal et al. | |
| 2002/0083175 A1 | 6/2002 | Afek et al. | |
| 2002/0099671 A1 | 7/2002 | Mastin et al. | |
| 2003/0014667 A1 | 1/2003 | Kolichtchak | |
| 2003/0023736 A1 | 1/2003 | Abkemeier | |
| 2003/0033510 A1 | 2/2003 | Dice | |
| 2003/0073894 A1 | 4/2003 | Chiang et al. | |
| 2003/0074552 A1 | 4/2003 | Olkin et al. | |
| 2003/0115222 A1 | 6/2003 | Oashi et al. | |
| 2003/0120601 A1 | 6/2003 | Ouye et al. | |
| 2003/0120811 A1 | 6/2003 | Hanson et al. | |
| 2003/0120935 A1 | 6/2003 | Teal et al. | |
| 2003/0145232 A1 | 7/2003 | Poletto et al. | |
| 2003/0163718 A1 | 8/2003 | Johnson et al. | |
| 2003/0167292 A1 | 9/2003 | Ross | |
| 2003/0167399 A1 | 9/2003 | Audebert et al. | |
| 2003/0200332 A1 | 10/2003 | Gupta et al. | |

(56) References Cited

U.S. PATENT DOCUMENTS

| | | |
|---|---|---|
| 2003/0212902 A1 | 11/2003 | van der Made |
| 2003/0220944 A1 | 11/2003 | Schottland et al. |
| 2003/0221190 A1 | 11/2003 | Deshpande et al. |
| 2004/0003258 A1 | 1/2004 | Billingsley et al. |
| 2004/0015554 A1 | 1/2004 | Wilson |
| 2004/0051736 A1 | 3/2004 | Daniell |
| 2004/0054928 A1 | 3/2004 | Hall |
| 2004/0143749 A1 | 7/2004 | Tajali et al. |
| 2004/0167906 A1 | 8/2004 | Smith et al. |
| 2004/0230963 A1 | 11/2004 | Rothman et al. |
| 2004/0243678 A1 | 12/2004 | Smith et al. |
| 2004/0255161 A1 | 12/2004 | Cavanaugh |
| 2005/0018651 A1 | 1/2005 | Yan et al. |
| 2005/0086047 A1 | 4/2005 | Uchimoto et al. |
| 2005/0108516 A1 | 5/2005 | Balzer et al. |
| 2005/0108562 A1 | 5/2005 | Khazan et al. |
| 2005/0114672 A1 | 5/2005 | Duncan et al. |
| 2005/0132346 A1 | 6/2005 | Tsantilis |
| 2005/0228990 A1 | 10/2005 | Kato et al. |
| 2005/0235360 A1 | 10/2005 | Pearson |
| 2005/0257207 A1 | 11/2005 | Blumfield et al. |
| 2005/0257265 A1 | 11/2005 | Cook et al. |
| 2005/0260996 A1 | 11/2005 | Groenendaal |
| 2005/0262558 A1 | 11/2005 | Usov |
| 2005/0273858 A1 | 12/2005 | Zadok et al. |
| 2005/0283823 A1 | 12/2005 | Okajo et al. |
| 2005/0289538 A1 | 12/2005 | Black-Ziegelbein et al. |
| 2006/0004875 A1 | 1/2006 | Baron et al. |
| 2006/0015501 A1 | 1/2006 | Sanamrad et al. |
| 2006/0037016 A1 | 2/2006 | Saha et al. |
| 2006/0080656 A1 | 4/2006 | Cain et al. |
| 2006/0085785 A1 | 4/2006 | Garrett |
| 2006/0101277 A1 | 5/2006 | Meenan et al. |
| 2006/0133223 A1 | 6/2006 | Nakamura et al. |
| 2006/0136910 A1 | 6/2006 | Brickell et al. |
| 2006/0136911 A1 | 6/2006 | Robinson et al. |
| 2006/0195906 A1 | 8/2006 | Jin et al. |
| 2006/0200863 A1 | 9/2006 | Ray et al. |
| 2006/0230314 A1 | 10/2006 | Sanjar et al. |
| 2006/0236398 A1 | 10/2006 | Trakic et al. |
| 2006/0259734 A1 | 11/2006 | Sheu et al. |
| 2007/0011746 A1 | 1/2007 | Malpani et al. |
| 2007/0028303 A1 | 2/2007 | Brennan |
| 2007/0039049 A1 | 2/2007 | Kupferman et al. |
| 2007/0050579 A1 | 3/2007 | Hall et al. |
| 2007/0050764 A1 | 3/2007 | Traut |
| 2007/0074199 A1 | 3/2007 | Schoenberg |
| 2007/0083522 A1 | 4/2007 | Nord et al. |
| 2007/0101435 A1 | 5/2007 | Konanka et al. |
| 2007/0136579 A1 | 6/2007 | Levy et al. |
| 2007/0143851 A1 | 6/2007 | Nicodemus et al. |
| 2007/0169079 A1 | 7/2007 | Keller et al. |
| 2007/0192329 A1 | 8/2007 | Croft et al. |
| 2007/0220061 A1 | 9/2007 | Tirosh et al. |
| 2007/0220507 A1 | 9/2007 | Back et al. |
| 2007/0253430 A1 | 11/2007 | Minami et al. |
| 2007/0256138 A1 | 11/2007 | Gadea et al. |
| 2007/0271561 A1 | 11/2007 | Winner et al. |
| 2007/0300215 A1 | 12/2007 | Bardsley |
| 2008/0005737 A1 | 1/2008 | Saha et al. |
| 2008/0005798 A1 | 1/2008 | Ross |
| 2008/0010304 A1 | 1/2008 | Vempala et al. |
| 2008/0022384 A1 | 1/2008 | Yee et al. |
| 2008/0034416 A1 | 2/2008 | Kumar et al. |
| 2008/0052468 A1 | 2/2008 | Speirs et al. |
| 2008/0082977 A1 | 4/2008 | Araujo et al. |
| 2008/0120499 A1 | 5/2008 | Zimmer et al. |
| 2008/0141371 A1 | 6/2008 | Bradicich et al. |
| 2008/0163207 A1 | 7/2008 | Reumann et al. |
| 2008/0163210 A1 | 7/2008 | Bowman et al. |
| 2008/0165952 A1 | 7/2008 | Smith et al. |
| 2008/0184373 A1 | 7/2008 | Traut et al. |
| 2008/0235534 A1 | 9/2008 | Schunter et al. |
| 2008/0294703 A1 | 11/2008 | Craft et al. |
| 2008/0301770 A1 | 12/2008 | Kinder |
| 2009/0007100 A1 | 1/2009 | Field et al. |
| 2009/0038017 A1 | 2/2009 | Durham et al. |
| 2009/0043993 A1 | 2/2009 | Ford et al. |
| 2009/0055693 A1 | 2/2009 | Budko et al. |
| 2009/0113110 A1 | 4/2009 | Chen et al. |
| 2009/0144300 A1 | 6/2009 | Chatley et al. |
| 2009/0150639 A1 | 6/2009 | Ohata |
| 2009/0249053 A1 | 10/2009 | Zimmer et al. |
| 2009/0249438 A1 | 10/2009 | Litvin et al. |
| 2009/0320140 A1 | 12/2009 | Sebes et al. |
| 2010/0071035 A1 | 3/2010 | Budko et al. |
| 2010/0077479 A1* | 3/2010 | Viljoen .......................... 726/23 |
| 2010/0100970 A1 | 4/2010 | Chowdhury et al. |
| 2010/0114825 A1 | 5/2010 | Siddegowda |
| 2010/0250895 A1 | 9/2010 | Adams et al. |
| 2010/0281133 A1 | 11/2010 | Brendel |
| 2010/0293225 A1 | 11/2010 | Sebes et al. |
| 2010/0332910 A1 | 12/2010 | Ali et al. |
| 2011/0029772 A1 | 2/2011 | Fanton et al. |
| 2011/0035423 A1 | 2/2011 | Kobayashi et al. |
| 2011/0047543 A1 | 2/2011 | Mohinder |
| 2011/0078550 A1 | 3/2011 | Nabutovsky |
| 2011/0093842 A1 | 4/2011 | Sebes |
| 2011/0099634 A1* | 4/2011 | Conrad et al. .................. 726/24 |
| 2011/0113467 A1 | 5/2011 | Agarwal et al. |
| 2011/0138461 A1 | 6/2011 | Bhargava et al. |
| 2012/0030731 A1 | 2/2012 | Bhargava et al. |
| 2012/0030750 A1 | 2/2012 | Bhargava et al. |
| 2012/0278853 A1 | 11/2012 | Chowdhury et al. |
| 2012/0290828 A1 | 11/2012 | Bhargava et al. |
| 2013/0024934 A1 | 1/2013 | Sebes et al. |
| 2013/0031111 A1* | 1/2013 | Jyoti et al. .................... 707/754 |
| 2013/0091318 A1 | 4/2013 | Bhattacharjee et al. |
| 2013/0097355 A1 | 4/2013 | Dang et al. |
| 2013/0097356 A1 | 4/2013 | Dang et al. |
| 2013/0117823 A1 | 5/2013 | Dang et al. |
| 2013/0247016 A1 | 9/2013 | Sharma et al. |
| 2013/0247027 A1 | 9/2013 | Shah et al. |
| 2013/0247032 A1 | 9/2013 | Bhargava et al. |
| 2013/0247192 A1 | 9/2013 | Krasser |
| 2013/0276111 A1* | 10/2013 | Taha ............................... 726/23 |
| 2013/0326620 A1* | 12/2013 | Merza et al. .................... 726/22 |
| 2014/0006405 A1 | 1/2014 | Bhargava et al. |

FOREIGN PATENT DOCUMENTS

| | | |
|---|---|---|
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2008/054997 A2 | 5/2008 |
| WO | WO 2011/059877 | 5/2011 |
| WO | WO 2012/015485 | 2/2012 |
| WO | WO 2012/015489 | 2/2012 |

OTHER PUBLICATIONS

A Tutorial on Clustering Algorithms, retrieved Sep. 10, 2010 from http://home.dei.polimi.it/matteucc/lustering/tutorial.html, 6 pages.

Cilibrasi, Rudi Langston, "Statistical Inference Through Data Compression," Institute for Logic, Language and Computation, ISBN: 90-6196-540-3, Copyright 2007, retrieved Sep. 10, 2010 from http://www.illc.uva.nl/Publications/Dissertations/DS-2007-01.text.pdf, 225 pages.

Desktop Management and Control, Website: http://www.vmware.com/solutions/desktop/, printed Oct. 12, 2009, 1 page.

Dommers, Calculating the normalized compression distance between two strings, Jan. 20, 2009, retrieved Sep. 10, 2010 from http://www.c-sharpcorner.com/UploadFile/acinonyx72/NCD01202009071004AM/NCD.aspx, 5 pages.

Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).

Karypis, et al., "CHAMELEON: A Hierarchical Clustering Algorithm Using Dynamic Modeling," copyright 2005-2010, George Karypis, Internal Lab Website, retrieved Sep. 10, 2010 from http://glaros.dtc.umn.edu/gkhome/cluto/cluto/publications, 1 page.

(56) References Cited

OTHER PUBLICATIONS

Karypis, George, Contact/METIS/CLUTO/MONSTER/YASSPP/ Forums, Internal Lab Website, copyright 2006-2010, retrieved Sep. 10, 2010 from http://glaros.dtc.umn.edu/gkhome, 1 page.
Kurt Gutzmann, "Access Control and Session Management in the HTTP Environment," Jan./Feb. 2001, pp. 26-35, IEEE Internet Computing.
Matt Rasmussen and George Karypis, "gCLUTO: An Interactive Clustering, Visualitzation, and Analysis System," copyright 2005-2010, George Karypis, Internal Lab Website, retrieved Sep. 10, 2010 from http://glaros.dtc.umn.edu/gkhome/cluto/gcluto/publications, 1 page.
Matthew Rasmussen, et al., "wCLUTO: A Web-enabled Clustering Toolkit," copyright 2005-2010, George Karypis, Internal Lab Website, retrieved Sep. 10, 2010 from http://glaros.dtc.umn.edu/gkhome/cluto/wcluto/publications, 1 page.
Secure Mobile Computing, Website: http://www.vmware.com/solutions/desktop/mobile.html, printed Oct. 12, 2009, 2 pages.
Steinbach, et al., "A Comparison of Document Clustering Techniques," copyright 2005-2010, George Karypis, Internal Lab Website, retrieved Sep. 10, 2010 from http://glaros.dtc.umn.edu/gkhome/cluto/cluto/publications, 1 page.
Tagarelli, et al., "A Segment-based Approach to Clustering Multi-Topic Documents," copyright 2005-2010, George Karypis, Internal Lab Website, retrieved Sep. 10, 2010 from http://glaros.dtc.umn.edu/gkhome/cluto/cluto/publications, 1 page.
U.S. Appl. No. 10/651,591, entitled "Method and System for Containment of Networked Application Client Software by Explicit Human Input," filed Aug. 29, 2003, Inventor(s): Rosen Sharma et al.
U.S. Appl. No. 11/060,683, entitled "Distribution and Installation of Solidified Software on a Computer," filed Feb. 16, 2005, Inventor(s): Bakul Shah et al.
U.S. Appl. No. 11/277,596, entitled "Execution Environment File Inventory," filed Mar. 27, 2006, Inventor(s): Rishi Bhargava et al.
U.S. Appl. No. 11/346,741, entitled "Enforcing Alignment of Approved Changes and Deployed Changes in the Software Change Life-Cycle," filed Feb. 2, 2006, Inventor(s): Rahul Roy-Chowdhury et al.
U.S. Appl. No. 11/379,953, entitled "Software Modification by Group to Minimize Breakage," filed Apr. 24, 2006, Inventor(s): E. John Sebes et al.
U.S. Appl. No. 11/437,317, entitled "Connectivity-Based Authorization," filed May 18, 2006, Inventor(s): E. John Sebes et al.
U.S. Appl. No. 12/008,274, entitled Method and Apparatus for Process Enforced Configuration Management, filed Jan. 9, 2008, Inventor(s): Rishi Bhargava et al.
U.S. Appl. No. 12/290,380, entitled "Application Change Control," filed Oct. 29, 2008, Inventor(s): Rosen Sharma et al.
U.S. Appl. No. 12/291,232, entitled "Method of and System for Computer System State Checks," filed Nov. 7, 2008, inventor(s): Rishi Bhargava et al.
U.S. Appl. No. 12/322,220, entitled "Method of and System for Malicious Software Detection Using Critical Address Space Protection," filed Jan. 29, 2009, Inventor(s): Suman Saraf et al.
U.S. Appl. No. 12/322,321, entitled "Method of and System for Computer System Denial-of-Service Protection," filed Jan. 29, 2009, Inventor(s): Suman Saraf et al.
U.S. Appl. No. 12/426,859, entitled "Method of and System for Reverse Mapping Vnode Pointers," filed Apr. 20, 2009, Inventor(s): Suman Saraf et al.
U.S. Appl. No. 12/545,609, entitled "System and Method for Enforcing Security Policies in a Virtual Environment," filed Aug. 21, 2009, Inventor(s): Amit Dang et al.
U.S. Appl. No. 12/545,745, entitled "System and Method for Providing Address Protection in a Virtual Environment," filed Aug. 21, 2009, Inventor(s): Preet Mohinder.
U.S. Appl. No. 12/615,521, entitled "System and Method for Preventing Data Loss Using Virtual Machine Wrapped Applications," filed Nov. 10, 2009, Inventor(s): Sonali Agarwal, et al.
U.S. Appl. No. 12/636,414, entitled "System and Method for Managing Virtual Machine Configurations," filed Dec. 11, 2009, Inventor(s): Harvinder Singh Sawhney, et al.
U.S. Appl. No. 12/844,892, entitled "System and Method for Protecting Computer Networks Against Malicious Software," filed Jul. 28, 2010, Inventor(s) Rishi Bhargava, et al.
U.S. Appl. No. 12/844,964, entitled "System and Method for Network Level Protection Against Malicious Software," filed Jul. 28, 2010, Inventor(s) Rishi Bhargava, et al.
U.S. Appl. No. 12/880,125, entitled "System and Method for Clustering Host Inventories," filed Sep. 12, 2010, Inventor(s) Rishi Bhargava, et al.
U.S. Appl. No. 12/903,993, entitled "Method and System for Containment of Usage of Language Interfaces," filed Oct. 13, 2010, Inventor(s) Rosen Sharma, et al.
U.S. Appl. No. 12/944,567, entitled "Classification of Software on Networked Systems," filed Nov. 11, 2010, Inventor(s) E. John Sebes, et al.
U.S. Appl. No. 12/946,081, entitled "Method and System for Containment of Usage of Language Interfaces," filed Nov. 15, Inventor(s) Rosen Sharma, et al.
U.S. Appl. No. 12/946,344, entitled "Method and System for Containment of Usage of Language Interfaces," filed Nov. 15, 2010, Inventor(s) Rosen Sharma, et al.
U.S. Appl. No. 12/975,745, entitled "Program-Based Authorization," filed Dec. 22, 2010, Inventor(s) Rishi Bhargava, et al.
Ying Zhao and George Karypis, "Clustering in Life Sciences," copyright 2005-2010, George Karypis, Internal Lab Website, retrieved Sep. 10, 2010 from http://glaros.dtc.umn.edu/gkhome/cluto/cluto/publications, 1 page.
Ying Zhao and George Karypis, "Criterion Functions for Document Clustering: Experiments and Analysis," copyright 2005-2010, George Karypis, Internal Lab Website, retrieved Sep. 10, 2010 from http://glaros.dtc.umn.edu/gkhome/cluto/cluto/publications, 1 page.
Ying Zhao and George Karypis, "Empirical and Theoretical Comparisons of Selected Criterion Functions for Document Clustering," copyright 2005-2010, George Karypis, Internal Lab Website, retrieved Sep. 10, 2010 from http://glaros.dtc.umn.edu/gkhome/cluto/cluto/publications, 1 page.
Ying Zhao and George Karypis, "Evaluation of Hierarchical Clustering Algorithms for Document Datasets," copyright 2005-2010, George Karypis, Internal Lab Website, retrieved Sep. 10, 2010 from http://glaros.dtc.umn.edu/gkhome/cluto/cluto/publications, 1 page.
Ying Zhao and George Karypis, "Hierarchical Clustering Algorithms for Document Datasets," copyright 2005-2010, George Karypis, Internal Lab Website, retrieved Sep. 10, 2010 from http://glaros.dtc.umn.edu/gkhome/cluto/cluto/publications, 1 page.
Ying Zhao and George Karypis, "Topic-Driven Clustering for Document Datasets," copyright 2005-2010, George Karypis, Internal Lab Website, retrieved Sep. 10, 2010 from http://glaros.dtc.umn.edu/gkhome/cluto/cluto/publications, 1 page.
Barrantes et al., "Randomized Instruction Set Emulation to Dispurt Binary Code Injection Attacks," Oct. 27-31, 2003, ACM, pp. 281-289.
Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.
Gaurav et al., "Countering Code-Injection Attacks with Instruction-Set Randomization," Oct. 27-31, 2003, ACM, pp. 272-280.
IA-32 Intel® Architecture Software Developer's Manual, vol. 3B; Jun. 2006; pp. 13, 15, 22 and 145-146.
Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.
Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.

(56) References Cited

OTHER PUBLICATIONS

Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.
Tal Garfinkel, et al., "Terra: A Virtual Machine-Based Platform for Trusted Computing," XP-002340992, SOSP'03, Oct. 19-22, 2003, 14 pages.
U.S. Appl. No. 13/037,988, entitled "System and Method for Botnet Detection by Comprehensive Email Behavioral Analysis," filed Mar. 1, 2011, Inventor(s) Sven Krasser, et al.
Notification of International Preliminary Report on Patentability and Written Opinion mailed May 24, 2012 for International Application No. PCT/US2010/055520, 5 pages.
Sailer et al., sHype: Secure Hypervisor Approach to Trusted Virtualized Systems, IBM research Report, Feb. 2, 2005, 13 pages.
U.S. Appl. No. 13/558,181, entitled "Method and Apparatus for Process Enforced Configuration Management," filed Jul. 25, 2012, Inventor(s) Rishi Bhargava et al.
U.S. Appl. No. 13/558,227, entitled "Method and Apparatus for Process Enforced Configuration Management," filed Jul. 25, 2012, Inventor(s) Rishi Bhargava et al.
U.S. Appl. No. 13/558,277, entitled "Method and Apparatus for Process Enforced Configuration Management," filed Jul. 25, 2012, Inventor(s) Rishi Bhargava et al.
Taskar et al., Probabilistic Classification and Clustering in Relational Data, 2001, Google, 7 pages.
USPTO May 24, 2013 Notice of Allowance from U.S. Appl. No. 12/880,125.
Myung-Sup Kim et al., "A load cluster management system using SNMP and web", [Online], May 2002, pp. 367-378, [Retrieved from Internet on Oct. 24, 2012], <http://onlinelibrary.wiley.com/doi/10.1002/nem.453/pdf>.
G. Pruett et al., "BladeCenter systems management software", [Online], Nov. 2005, pp. 963-975, [Retrieved from Internet on Oct. 24, 2012], <http://citeseerx.1st.psu.edu/viewdoc/download?doi=10.1.1.91.5091&rep=rep1&type=pdf>.
Philip M. Papadopoulos et al., "NPACI Rocks: tools and techniques for easily deploying manageable Linux clusters" [Online], Aug. 2002, pp. 707-725, [Retrieved from internet on Oct. 24, 2012], <http://onlinelibrary.wiley.com/doi/10.1002/cpe.722/pdf>.
Thomas Staub et al., "Secure Remote Management and Software Distribution for Wireless Mesh Networks", [Online], Sep. 2007, pp. 1-8, [Retrieved from Internet on Oct. 24, 2012], <http://cds.unibe.ch/research/pub_files/B07.pdf>.
International Preliminary Report on Patentability received for the PCT Application No. PCT/US2011/020677, mailed on Feb. 7, 2013, 9 pages.
International Preliminary Report on Patentability received for the PCT Application No. PCT/US2011/024869, mailed on Feb. 7, 2013, 6 pages.
Office Action received for the U.S. Appl. No. 12/880,125, mailed on Jul. 5, 2012, 12 pages.
Ex Parte Quayle Action received for the U.S. Appl. No. 12/880,125, mailed on Dec. 21, 2012, 4 pages.
USPTO May 9, 2014 Notice of Allowance received for U.S. Appl. No. 14/016,497, 18 pages.
Larsen, Bjornar et al., "Fast and effective text mining using linear-time document clustering," 1999, ACM, pp. 16-22.

\* cited by examiner

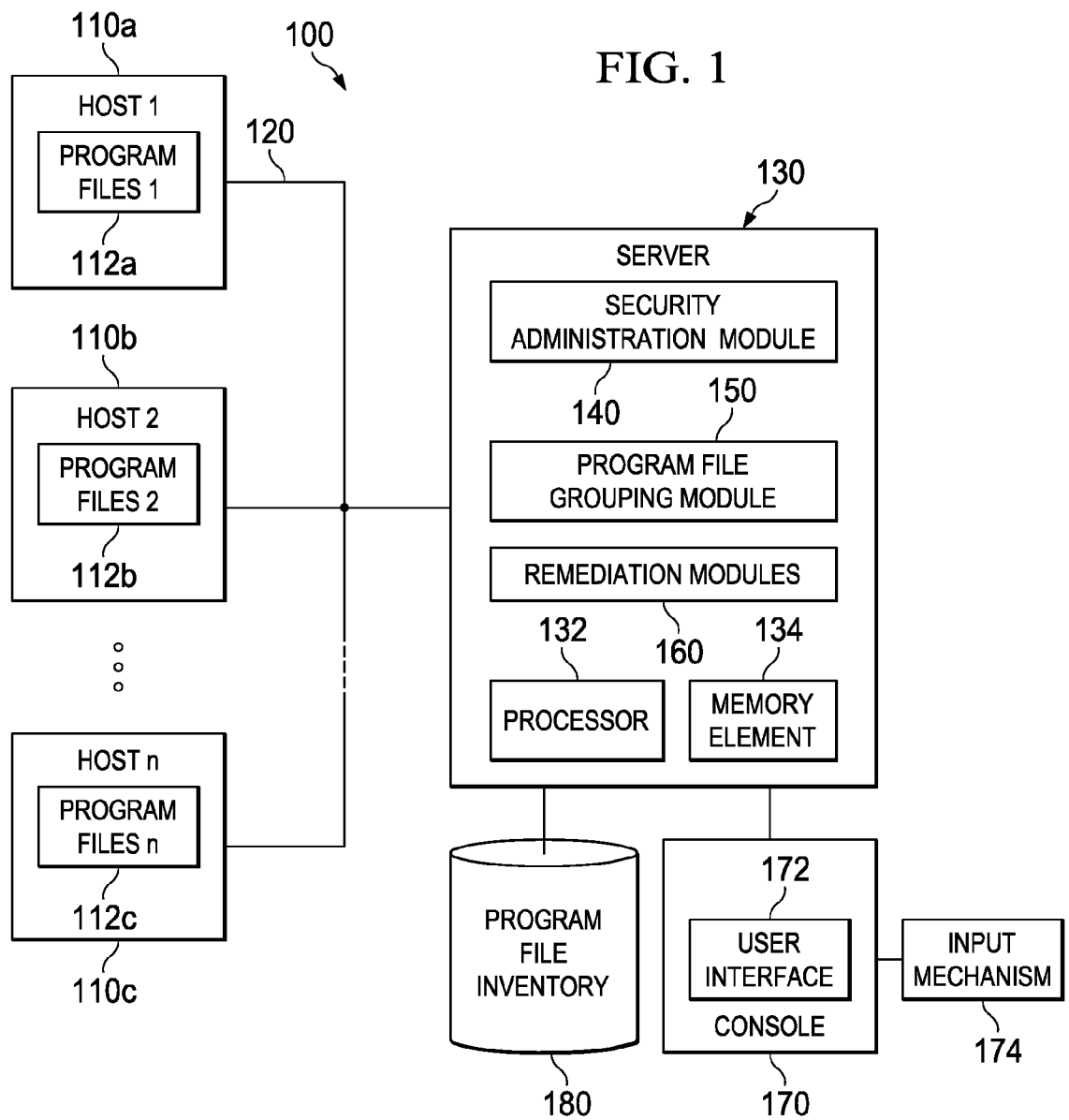

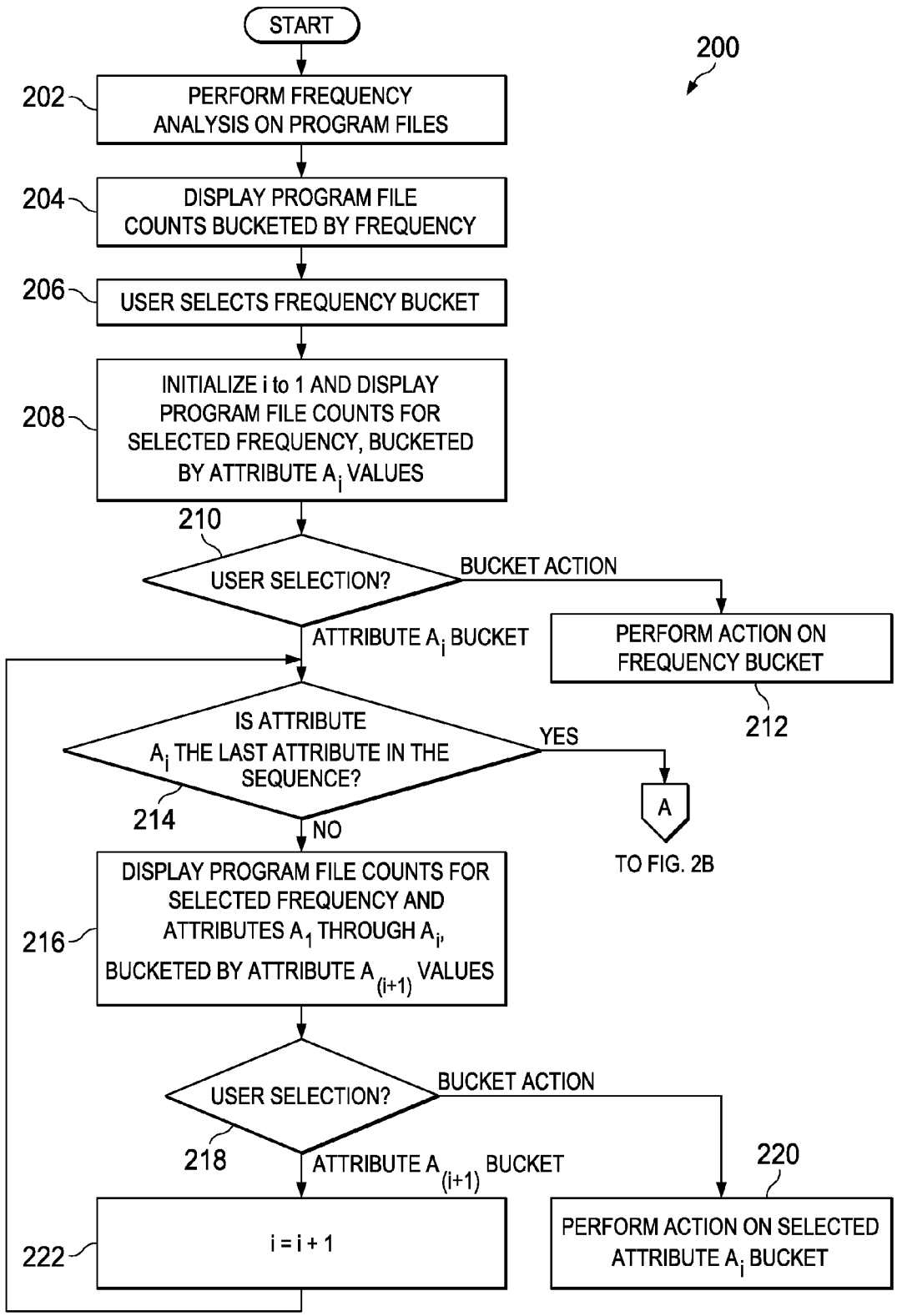

SYSTEM AND METHOD FOR SELECTIVELY GROUPING AND MANAGING PROGRAM FILES

RELATED U.S. APPLICATION INFORMATION

This application is related to co-pending U.S. patent application Ser. No. 12/880,125, filed Sep. 12, 2010, entitled "SYSTEM AND METHOD FOR CLUSTERING HOST INVENTORIES," by Inventors Rishi Bhargava et al. The disclosure of that application is considered part of and is incorporated by reference herein in its entirety.

TECHNICAL FIELD OF THE INVENTION

This invention relates in general to the field of data management and, more particularly, to a system and a method for selectively grouping and managing program files.

BACKGROUND OF THE INVENTION

The field of computer network administration and support has become increasingly important and complicated in today's society. Computer network environments are configured for virtually every enterprise or organization, typically with multiple interconnected computers (e.g., end user computers, laptops, servers, printing devices, etc.). In many such enterprises, Information Technology (IT) administrators may be tasked with maintenance and control of the network environment, including executable software files on hosts, servers, and other network computers. Executable software files or program files may be generally classified as whitelist software (i.e., known safe software), blacklist software (i.e., known unsafe software), and greylist software (i.e., unknown software). As the number of executable software files in a network environment increases, the ability to control, maintain, and remediate these files efficiently can become more difficult. Generally, greater diversity of software implemented in various computers of a network translates into greater difficulty in managing such software. For example, in large enterprises, executable software inventories may vary greatly among end user computers across departmental groups, requiring time and effort by IT administrators to identify and manage executable software in such a diverse environment. Thus, innovative tools are needed to assist IT administrators in the effective control and management of executable software files on computers within computer network environments.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 1 is a simplified block diagram of an exemplary implementation in a network environment of a system for selectively grouping and managing program files;

FIGS. 2A and 2B are simplified flowcharts illustrating a series of example steps associated with an embodiment of the system of the present disclosure.

DETAILED DESCRIPTION OF EXAMPLE EMBODIMENTS

Overview

Figure 2B:
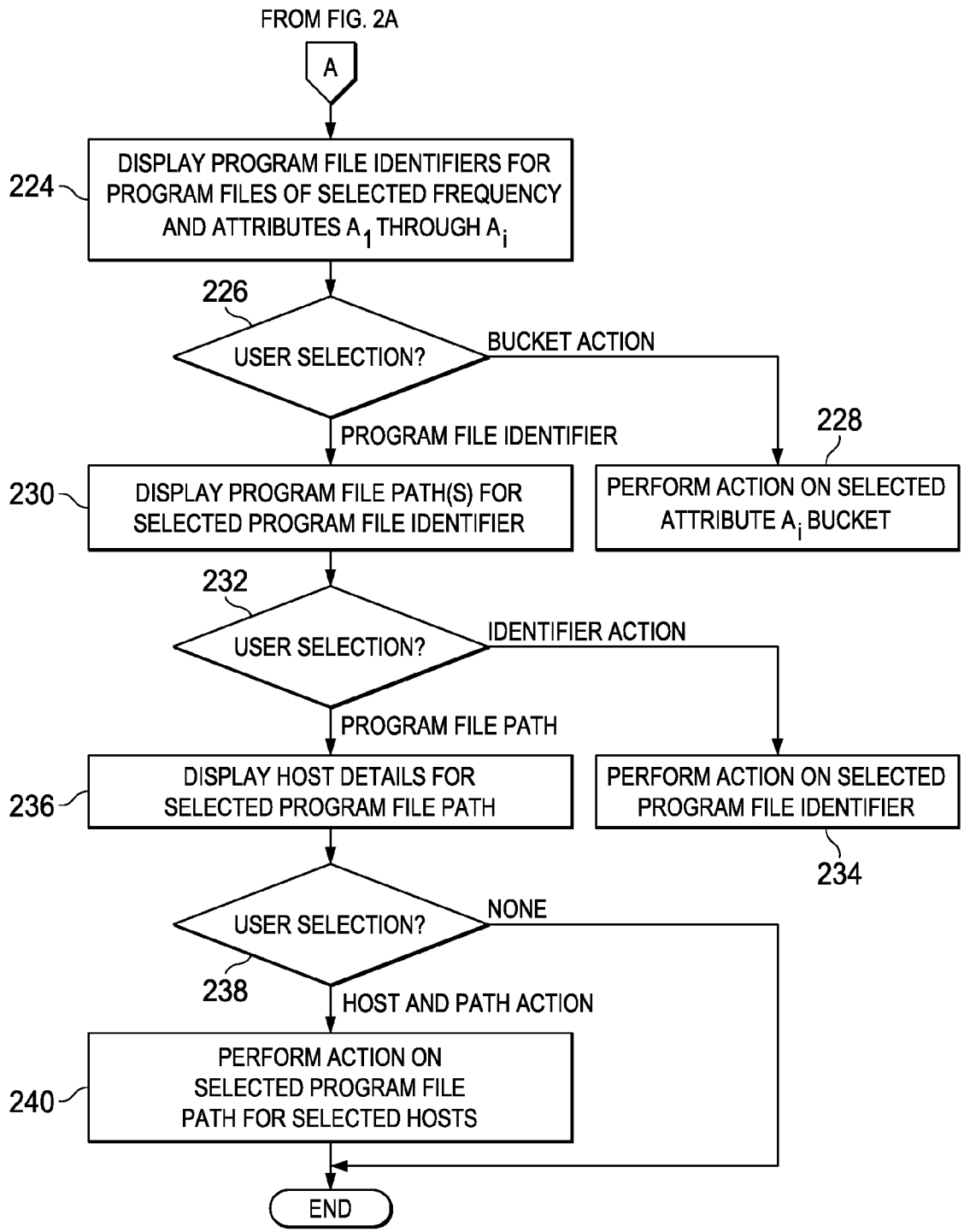

A method in one example embodiment includes determining a frequency range corresponding to a subset of a plurality of program files on a plurality of hosts in a network environment. The method also includes generating a first set of counts including a first count that represents an aggregate amount of program files in a first grouping of one or more program files of the subset. In this method each of the one or more program files of the first grouping includes a first value of a primary attribute. In specific embodiments, each of the plurality of program files is an unknown program file. In further embodiments, the primary attribute is one of a plurality of file attributes provided in file metadata. Other specific embodiments include either blocking or allowing execution of each of the program files of the first grouping. More specific embodiments include determining a unique identifier corresponding to at least one program file of the first grouping and determining a file path count representing an aggregate amount of one or more unique file paths associated with the unique identifier. Other specific embodiments include determining a plurality of frequencies corresponding respectively to the plurality of program files, where each of the plurality of frequencies is determined by calculating all occurrences of a respective one of the plurality of program files in the plurality of hosts.

Example Embodiments

FIG. 1 is a simplified block diagram illustrating an example implementation of a software management system 100 for selectively grouping and managing program files in a network environment. The exemplary network environment illustrates a server 130 suitably connected to hosts 110*a*, 110*b*, and 110*c* (referred to collectively herein as hosts 110) with respective program files 112*a*, 112*b*, and 112*c* (referred to collectively herein as program files 120). Software elements of software management system 100 may be implemented in a computer, such as server 130. In one embodiment, server 130 may include software elements such as a security administration module 140, a program file grouping module 150, and remediation modules 160. Hardware elements such as a processor 132 and a memory element 134 may also be provided in server 130. Additional memory in the form of a program file inventory 180 may be suitably connected to server 130. A console 170, with a user interface 172 and an input mechanism 174, for interacting with software elements of software management system 100 may also be suitably connected to server 130.

The network environment illustrated in FIG. 1 may be generally configured or arranged to represent any communication architecture capable of electronically exchanging packets. In addition, the network may also be configured to exchange packets with other networks such as, for example, the Internet, or other LANs. Other common network elements (e.g., email gateways, web gateways, routers, switches, load-balancers, firewalls, etc.), may also be provisioned in the network.

Software management system 100 may be utilized to maximize the effectiveness of actions taken by a user (e.g., IT administrators, network operators, etc.) against selected program files in a network environment. Embodiments of system 100 can provide valuable information about unknown software files and can provide remediation options that can be selectively applied to individual unknown software files or to selected groupings of unknown software files. In one example embodiment, when software management system 100 is implemented in a computer network environment as shown in FIG. 1, a grouping process may be applied to an unknown software inventory of a selected set of computers (e.g., hosts 110) in the network. The program files identified in the unknown software inventory may be evaluated and grouped according to a predefined frequency measure and various file attributes, in succession. A user may select an action to be performed on all program files in a grouping, where each of the program files in the grouping has the same distinct value for a particular file attribute (e.g., vendor, product, product version, etc.). The program files of the grouping may also be associated with the same distinct values of one or more other file attributes previously selected by the user. The user may also successively select file attribute groupings until each unknown program file, having the same distinct values of the file attributes selected by the user, is identified by a unique identifier, by a program file path, and/or by a particular host. The user may select one or more of the unique identifiers, program file paths, or hosts to perform a desired action to remediate the corresponding unknown program files. Thus, system 100 enables the user to more effectively and efficiently manage unknown program files on a set of computers in a particular network environment.

For purposes of illustrating the techniques of software management system 100, it is important to understand the activities and security concerns that may be present in a given network such as the network shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typical network environments, both in organizations (e.g., businesses, schools, government organizations, etc.) and in homes, include a plurality of computers such as end user desktops, laptops, servers, network appliances, and the like, with each computer having an installed set of executable software. In large organizations, network environments may include hundreds or thousands of computers, which can span different buildings, cities, and/or geographical areas around the world. IT administrators are often tasked with the extraordinary responsibility of maintaining these computers and their software in a way that minimizes or eliminates disruption to the organization's activities.

One difficulty IT administrators face when managing a network environment is ensuring that only trusted and approved executable software files are present. Although computers in a network may initially be configured with only trusted and approved executable software, continuous efforts (both electronic and manual) are usually necessary to protect against unknown and/or malicious software. Various protection systems can be implemented that seek to prevent unknown and/or malicious software from infecting the network computers. For example, traditional anti-virus solutions search databases of malicious software (i.e., blacklists) and prevent any software identified on a blacklist from being executed. Blacklists, however, only contain known threats and, consequently, are ineffective against new malware or targeted attacks. Moreover, malicious users are constantly devising new schemes to penetrate secure networks with malicious software. Once a new piece of malicious software has been created, traditional blacklists will not include such new software until it has been identified as a possible threat, evaluated, and determined to be malicious, often giving the new piece of software time to propagate and spread throughout multiple networks.

Other protection systems include whitelisting solutions, which search databases of known trusted software (i.e., whitelists) and only allow software to execute if the software is identified on the whitelist. Although these systems provide complete protection in preventing unknown and/or malicious software from being executed, such solutions still suffer from several drawbacks. In particular, whitelisting solutions can be inflexible, potentially creating delays and disruptions when new software is needed and adding additional steps to administrative workflows. Moreover, unknown and/or malicious software may nevertheless be present in the memory or disks of various computer networks, consuming valuable resources and risking inadvertent execution or propagation (e.g., if the whitelisting solution is temporarily or permanently disabled, if the software is copied to portable memory and introduced into a less protected network environment, etc.).

While anti-virus solutions utilize blacklist software, and whitelisting solutions utilize whitelist software in their protection schemes, a third type of software may exist in a network environment: unknown or "greylist" software. Unknown or greylist software is software not explicitly known to be malicious or trusted. Anti-virus solutions may allow all unknown software to be executed, while whitelisting solutions may prevent all unknown software from being executed. Each solution suffers from the lack of an efficient method of distinguishing between and appropriately remediating unknown safe software that has been introduced into a network for legitimate purposes and unknown malicious software that has infiltrated a network. Unknown software can be identified using, for example, existing solutions such as malicious software protection systems of co-pending U.S. patent application Ser. No. 12/844,892, entitled "SYSTEM AND METHOD FOR LOCAL PROTECTION AGAINST MALICIOUS SOFTWARE" and U.S. patent application Ser. No. 12/844,964, entitled "SYSTEM AND METHOD FOR NETWORK LEVEL PROTECTION AGAINST MALICIOUS SOFTWARE," both filed on Jul. 28, 2010, by Rishi Bhargava et al. (referred to hereinafter as "co-pending U.S. patent application Ser. No. '892" and "co-pending U.S. patent application Ser. No. '964", respectively). In another embodiment, unknown software files could be identified by obtaining an inventory of every program file existing in every computer of a network (or in a selected set of computers of a network) and comparing the inventory to one or more third-party global and/or local whitelists and blacklists. Effectively remediating the identified unknown software, however, presents more difficulty.

Because a greylist may contain both malicious and non-malicious software files, ideally, such files need to be evaluated individually. For example, any non-malicious file having a legitimate purpose could be approved and added to a whitelist or otherwise enabled for execution within the network. Files determined to be malicious could be blacklisted, removed from the network, and/or otherwise disabled from execution. Suspect files without a known legitimate purpose, which may or may not be malicious, could be quarantined pending further evaluation. Managing such files individually, however, can be both labor-intensive and time-consuming, at least in part because the computers within the particular network may lack congruency of the unknown software. For example, unknown software files may be stored in different memory or disk locations on different computers, different versions of the unknown software files may be installed in different computers, unknown software files may be stored on some computers but not on others, and the like.

Another problematic issue in managing such files can arise because different IT administrators may prefer to remediate unknown software using different techniques and criteria. For example, one organization may have a relaxed policy allowing any software to be implemented in any computer of their network if the software is from a particular vendor. Other organizations may have a more stringent policy such as requiring the same product version of a particular software product to be stored in the same file path location of each computer. Thus, flexible identification and remediation techniques are needed to adequately address the needs of IT administrators in managing unknown software for different organizations.

A system for selectively grouping and managing program files outlined by FIG. 1 can resolve many of these issues. In accordance with one example implementation of software management system 100, a method is provided of sifting through a set of unknown program files and selecting one or more desired groupings of the unknown program files (e.g., a grouping associated with a particular value of a single file attribute, a grouping associated with a plurality of values of a respective plurality of file attributes, a grouping associated with a single program file on a single host, etc.). The user may then remediate the one or more program files of the selected grouping in any number of ways, including performing various actions to effectively block or allow execution (e.g., adding program files to a whitelist, adding program files to a blacklist, removing, renaming, or quarantining program files, etc.). Thus, the user is provided an opportunity to maximize efforts of managing unknown program files within the network by, for example, taking action on the largest groupings of similar unknown program files and by selecting groupings identified from the highest frequency ranges across the network.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Turning to the infrastructure of FIG. 1, the example network environment may be configured as one or more networks and may be configured in any form including, but not limited to, local area networks (LANs), wireless local area networks (WLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link 120 may represent any electronic link supporting a LAN environment such as, for example, cable, Ethernet, wireless technologies (e.g., IEEE 802.11x), ATM, fiber optics, etc. or any suitable combination thereof. In other embodiments, communication link 120 may represent a remote connection to central server 130 through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet). In addition, gateways, routers, switches, and any other suitable network elements may be used to facilitate electronic communication between hosts 110 and central server 130. Note that the network illustrated in FIG. 1, may include a configuration capable of transmission control protocol/internet protocol (TCP/IP) communications for the transmission and/or reception of packets in the network. The network could also operate in conjunction with a user datagram protocol/IP (UDP/IP) or any other suitable protocol, where appropriate and based on particular needs.

In an example embodiment, hosts 110 may represent end user computers that could be operated by end users. The end user computers may include desktops, laptops, and mobile or handheld computers (e.g., personal digital assistants (PDAs) or mobile phones), or any other type of computing device operable by an end user. Hosts 110 can also represent other computers (e.g., servers, appliances, etc.) having program files, which could be similarly grouped and managed by system 100, using executable file inventories derived from sets of program files 112 on such hosts 110. It should be noted that the network configurations and interconnections shown and described herein are for illustrative purposes only. FIG. 1 is intended as an example and should not be construed to imply architectural limitations in the present disclosure.

Sets of program files 112 on hosts 110 can include all executable files on respective hosts 110. In this Specification, references to "executable program file", "executable file", "program file", "executable software file", "executable software", "software program", and "software program file" are meant to encompass any software file comprising instructions that can be understood and processed by a computer such as executable files, library modules, object files, other executable modules, script files, interpreter files, and the like. In addition, although reference is made herein to using unknown program file inventories, it will be apparent that any other inventory of program files could be processed by system 100 and successively grouped according to frequency, file attributes, file identifiers, file paths and/or hosts. In one embodiment, the system could be configured to allow the IT administrator to select a particular set of program files to be evaluated. For example, an IT Administrator may select a program file inventory derived from the results of clustering as described in co-pending U.S. patent application Ser. No. 12/880,125, entitled "SYSTEM AND METHOD FOR CLUSTERING HOST INVENTORIES," filed Sep. 12, 2010, by Rishi Bhargava et al., which has been previously fully incorporated by reference herein (referred to hereinafter as "co-pending U.S. patent application Ser. No. '125"). In addition, the IT administrator may also be permitted to select particular hosts from which the executable file inventory is derived. For example, all end user computers in a network or within a particular part of the network (e.g., a particular business unit of an organization) may be selected. In another example, a particular type of host such as, for example, all servers within a network or within a particular part of the network may be selected.

Central server 130 as illustrated in FIG. 1 represents an exemplary server linked to hosts 110, which may provide services to hosts 110. Software management system 100 may be implemented in central server 130 with program file grouping module 150, remediation modules 160, and access to program file inventory 180. Program file inventory 180 may be a selected set of executable files (e.g., a greylist or unknown executable files) of all hosts 110 or a selected set of hosts 110. Alternatively, program file inventory 180 could be an inventory of all executable files in hosts 110 or a selected set of hosts 110.

Not shown in central server 130 of FIG. 1 is additional hardware that may be suitably coupled to processor 132 in the form of memory management units (MMU), additional symmetric multiprocessing (SMP) elements, peripheral component interconnect (PCI) bus and corresponding bridges, small computer system interface (SCSI)/integrated drive electronics (IDE) elements, etc. In addition, suitable modems and/or network adapters may also be included for allowing network access. Any suitable operating systems may also be configured in server 130 to appropriately manage the operation of hardware components therein. Server 130 may include any other suitable hardware, software, components, modules, interfaces, or objects that facilitate the operations thereof. This may be inclusive of appropriate algorithms and communication protocols that facilitate the selective grouping and managing operations detailed herein. Similarly, hosts 110 may also be configured with any appropriate processors, memory, and other hardware, software, components, modules, interfaces or objects that facilitate the operations thereof, and that store program files 112.

These elements, shown and/or described with reference to server 130 and hosts 110 are intended for illustrative purposes and are not meant to imply architectural limitations. In addition, each computer, including server 130 and hosts 110, may include more or less components where appropriate and based on particular requirements. As used herein in this Specification, the term 'computer' is meant to encompass any personal computers, laptops, network appliances, routers, switches, gateways, processors, servers, load balancers, firewalls, or any other suitable device, component, element, or object operable to affect or process electronic information in a network environment.

Management console 170 may include user interface 172 and input mechanism 174 to allow a user to interact with central server 130. In one example embodiment, user interface 172 may be a graphical user interface (GUI). In addition, appropriate input mechanisms could include a keyboard, mouse, voice recognition, touch pad, input screen, etc. Program file grouping module 150 may provide viewable data related to program file groupings on the graphical user interface for the IT administrator or other authorized user to view, to select for remediation, or to select for further analysis. Management console 170 may also be used to select particular hosts and/or particular types of executable files to be included in the program file inventory for selectively grouping and managing the program files identified therein.

Software management system 100 may be adapted to provide grouping and managing activities for electronic data (e.g., program files), which could be resident in memory of a computer or other electronic storage device. Information related to the grouping and managing activities can be suitably rendered, or sent to a specific location (e.g., management console 170, etc.), or simply stored or archived, and/or properly displayed in any appropriate format.

Security administration module 140 may provide an existing infrastructure of network security and management and may be suitably integrated with software management system 100. One exemplary enterprise management system that could be used includes McAfee® electronic Policy Orchestrator (ePO) software manufactured by McAfee, Inc. of Santa Clara, Calif. Other security software that may be integrated with or otherwise cooperatively provisioned in a network with software management system 100 includes full or selected portions of co-pending U.S. patent application Ser. No. '892 and co-pending U.S. patent application Ser. No. '964, previously referenced herein, and co-pending U.S. patent application Ser. No. '125, previously incorporated herein by reference. In addition, security technology that performs one or more remediation activities, as represented by remediation modules 160 in FIG. 1, can include elements such as McAfee® Anti-Virus software, McAfee® Host Intrusion Prevention System (HIPS) software, McAfee® Application Control software, or any third party software provisioning system configured to perform these remediation activities. Thus, any such components may be included within the broad scope of the term 'software management system' as used herein in this Specification. The program file inventory 180 may include information related to the evaluation of electronic data, such as file identifiers and file attributes of a selected inventory of program files (e.g., unknown program files, program files from clustering activities, etc.) on hosts 110 and these elements can readily cooperate, coordinate, or otherwise interact with software management system 100.

Turning to FIGS. 2A and 2B, simplified flowcharts illustrate operational processing of one embodiment of software management system 100. Flow begins at step 202 where a frequency analysis is performed on a program file inventory. In one embodiment, the program file inventory includes all unknown program files on hosts 110 within the network. These unknown executable files can be detected using any suitable technique such as, for example, the malicious software protection systems of co-pending U.S. patent application Ser. No. '892 and co-pending U.S. patent application Ser. No. '964, both of which have been previously referenced herein. In addition, the program file inventory could be limited to program files on specified hosts (e.g., hosts within a particular business segment of the organization, etc.).

Frequency analysis of the program files identified in the inventory can be achieved in various ways. In one embodiment, the frequency measure of a particular program file is a total count of occurrences of the particular program file in hosts across a network of an organization. Another frequency measure could be a total number of hosts on which a particular program file occurs. Other frequency measures include counting the occurrences of a particular program file in a total number of business units of the organization, in a total number of geographical locations of the organization, or in a total number of machine roles. In addition, host details may be included when creating frequency measures. For example, a total number of operating system patch levels or different operating systems on which a program file is found may be included in the frequency measure. Generally, any grouping of hosts may be used to define the frequency measure. Moreover, some embodiments of system 100 can be implemented to allow a user to select the frequency measure to be used or to allow the user to provide frequency measure configuration data. In other embodiments, the frequency measure can be preconfigured in system 100.

After the frequency analysis is performed in step 202, in step 204 a screen display may be provided on, for example, user interface 172 of console 170, for a user to view the frequency ranges of the program files and to select a particular frequency range for further analysis. In one embodiment, the frequency ranges may be displayed in the form of a bar graph, showing the program file counts bucketed by frequency ranges (e.g., fifths (0-20%, 20-40%, 40-60%, 60-80%, 80-100%), quarters (0-25%, 25-50%, 50-75%, 75-100%), thirds (0-33%, 33-66%, 66-100%), etc.) and showing the corresponding program file count for each frequency range of the particular frequency measure. Accordingly, each frequency range that indicates a count of at least one program file corresponds to a subset of the program files identified in the inventory. In step 206, the user may select any of the frequency ranges (or buckets) to further analyze the program files within the selected frequency range. In one embodiment, system 100 is configured such that input mechanism 174 (e.g., mouse, touchpad, voice, etc.) can be used to select the desired frequency bar displayed on user interface 172 of console 170.

Once the user selects a particular frequency range, flow passes to steps 208 through 222 where a sequence of one or more file attributes, indicated by $A_n$ (n=number of unique file attributes), may be used successively and cumulatively to bucket selected groupings of program files. Example file attributes may include one or more intrinsic file attributes such as vendor, product, product version, file version, file description, and/or any other suitable attribute available in the file metadata. Extrinsic file attributes may also be used, including, for example, attributes stored in a database indicating the type of software of a particular program file (e.g., System Utility, Programmer Tool, Productivity Tool, etc.), and/or any other suitable extrinsic file attribute.

In step 208, a variable 'i' is initialized to 1, and a subset of program files corresponding to the selected frequency range, may be bucketed by one or more distinct values of the first or primary file attribute $A_1$. In one embodiment, the bucketing by file attribute values can be displayed to the user on the user interface 172 of console 170 in the form of a pie chart. Each pie slice (or bucket) can represent a respective $A_1$ grouping of one or more program files of the subset, where the one or more program files of a particular $A_1$ grouping are each associated with the same distinct value of file attribute $A_1$. In addition, each pie slice (or bucket) can indicate a count (or proportion) of the one or more program files of the respective $A_1$ grouping. For example, if file attribute $A_1$ represents vendors, and if the selected frequency range (e.g., 80-100%) includes program files of eight different vendors, then the pie chart could include eight pie slices, with each pie slice indicating a count of program files associated with one of the eight vendors. Thus, a set of eight counts could correspond to file attribute $A_1$ and each count within the set of eight counts could represent an aggregate amount of the one or more program files in a respective $A_1$ grouping.

After the file attribute $A_1$ bucketing has been displayed, flow may pass to decision box 210 to determine whether the user has selected a particular $A_1$ bucket, or whether the user has selected an action to be performed on the program files associated with the previously selected frequency range. If the user has selected an action to be performed, then flow passes to step 212, such that a chosen action is performed on each program file represented by the previously selected frequency range.

System 100 may be implemented to provide various options for performing an action to manage or remediate groupings of program files. Such options may include, generally, blocking or allowing execution of program files. Such blocking or allowing may be accomplished by, for example, blocking execution of a program file, adding a program file to a whitelist, adding a program file to a blacklist, moving, replacing, renaming, or quarantining a program file, changing a network configuration of hosts containing program files to block certain network traffic, starting or stopping processes of hosts containing program files, modifying the software configuration of hosts containing program files, and opening a change request using a change ticketing system. In addition, further options may be suitably integrated to assist a user in evaluating whether particular program files in a grouping should be trusted. For example, system 100 could allow actions to be performed on particular program files, such as running a virus scan, performing heuristic analysis, and the like. Other actions could be facilitated by system 100 to detect potential unlicensed software. These other actions could include comparing a selected program file to a packet manager to determine whether the program file corresponds to an installed software package. To achieve these management and remediation actions, system 100 may be suitably integrated with various existing security technologies such as, for example, McAfee® Anti-Virus software, McAfee® HIPS software, McAfee® Application Control whitelisting software, or any other appropriate security software. In other embodiments, however, the option to perform an action on an entire frequency range may be omitted, and such options may just be provided in more defined groupings of program files, such as groupings by file attributes and/or identifications of file identifiers, file path names, and/or hosts.

Once the chosen action is performed on the previously selected frequency range of program files, as indicated in step 212, then the user may begin the analysis again with an updated or new program file inventory, or may continue to select other buckets to further analyze and possibly remediate selected groupings of program files. For example, a user may decide to quarantine all unknown executable files associated with a first selected frequency range. Once the quarantine action has been performed, the user may continue to analyze the now quarantined program files of the selected first frequency range until additional information about the quarantined program files is determined. Alternatively, after quarantining the first frequency range, the user may select another frequency range to evaluate and may possibly remediate program files associated with the other selected frequency range after further grouping of such program files by file attributes and/or by identifying the particular file identifiers, program file paths, and/or particular hosts associated with the program files.

With reference again to step 210, if the user selects one of the file attribute $A_i$ buckets by, for example, using user interface 172 of console 170 to click on one of the pie slices in the pie chart, then flow passes to steps 214 through 222. Steps 214 through 222 may be configured to recur such that a different file attribute in the sequence of file attributes $A_n$ is used to bucket each successive grouping of program files represented by the previous bucket selected by the user. A different file attribute may be used during each recurrence of steps 214 through 222 until the file attribute sequence $A_n$ is exhausted or until no further bucket selection input is received from the user (e.g., the user does not select a bucket, the user selects an action to be performed on a bucket).

If the user selects one of the file attribute $A_1$ buckets in step 210, then flow passes to decision box 214 where a determination is made as to whether $A_i$ is the last file attribute in the sequence $A_n$. If $A_i$ is not the last file attribute in the sequence $A_n$, then flow passes to step 216 where distinct values of the next file attribute $A_{(i+1)}$ in the sequence $A_n$ are used to bucket the selected $A_i$ grouping of program files represented by the selected $A_i$ bucket. Each $A_{(i+1)}$ bucket (or pie slice in one embodiment) can represent a respective $A_{(i+1)}$ grouping of one or more program files of the selected $A_i$ grouping, where each of the one or more program files of a particular $A_{(i+1)}$ grouping are associated with the same distinct value of file attribute $A_{(i+1)}$. Additionally, all of the program files in all of the $A_{(i+1)}$ groupings are associated with the previously selected frequency range and the previously selected values of file attributes $A_1$ through $A_i$.

A set of counts may be determined such that each bucket (or pie slice), corresponding to a distinct value of the file attribute $A_{(i+1)}$ and representing a respective $A_{(i+1)}$ grouping, indicates a count (or proportion) of the one or more program files of the respective $A_{(i+1)}$ grouping. Thus, each count in the set of counts can indicate an aggregate amount of the one or more program files in its respective $A_{(i+1)}$ grouping.

After the file attribute $A_{(i+1)}$ bucketing has been displayed, flow passes to decision box 218 to determine whether the user has selected a particular $A_{(i+1)}$ bucket, or whether the user has selected an action to be performed to the previously selected $A_i$ bucket. If the user has chosen an action to be performed, then flow passes to step 220, such that the chosen action is performed on each program file represented by the previously selected $A_i$ bucket. As previously described herein, system 100 may be implemented to provide various options for performing an action to manage or remediate program files (e.g., whitelisting, blacklisting, moving, replacing, renaming, blocking, quarantining, etc.) and may be suitably integrated with various existing security technologies to achieve these managing and remediating activities.

Once the action is performed on the previously selected $A_i$ bucket in step 220, the user may begin the analysis again with an updated or new program file inventory, or may continue to select $A_{(i+1)}$ buckets or buckets from any of the previously displayed bucketing screens to further analyze and possibly remediate other selected groupings of executable program files. In one example, a user may decide to quarantine all unknown program files associated with a particular product of a particular vendor. Once the quarantine action has been performed in step 220, the user may continue to select displayed buckets until additional information about the now quarantined program files is determined. If any of the quarantined files are determined to be stored on a rogue host (e.g., associated with a terminated employee) then the user may decide to go ahead and remove such program files from the host. In another example, a user may decide to remove all program files associated with a particular vendor (e.g., a first distinct value of $A_1$). Once the files associated with the selected first vendor are removed, the previous file attribute $A_i$ bucketing may be displayed so that the user may continue to analyze and possibly remediate the program files associated with the other vendors (i.e., other distinct values of $A_1$) by further grouping such program files using additional file attributes and/or by identifying the particular file identifiers, program file paths, and/or particular hosts associated with the program files.

With reference again to step 218, if the user selects a particular $A_{(i+1)}$ bucket, then flow passes to step 222 where the value of the variable 'i' is changed to i+1. Flow then loops back to step 214 to determine whether the file attribute $A_i$ is the last attribute in the sequence $A_n$. As long as the user continues to select a particular $A_{(i+1)}$ bucket, steps 214-222 may continue to recur until the sequence $A_n$ is exhausted. Once the sequence $A_n$ is exhausted (i.e., $A_i$ is the last attribute in the sequence), as determined in step 214, flow passes to step 224 of FIG. 2B.

In step 224 of FIG. 2B, a set of unique file identifiers is determined and displayed for the corresponding one or more program files represented by the last $A_i$ bucket selected by the user. In one embodiment, the file identifiers can be a cryptographic hash function such as, for example, Secure Hash Algorithm 1 (SHA-1), which is a well-known algorithm, widely used in security applications. The unique file identifiers may be displayed on user interface 172 of console 170 along with, optionally, additional information related to each unique file identifier. Such additional information may include a unique file path count for each file identifier, where each unique file path count indicates an aggregate number of unique file paths associated with the corresponding unique file identifier. In addition, the ability to select one or more unique file identifiers for further analysis and the ability to perform an action on all of the program files in the grouping represented by the previously selected $A_i$ bucket (and corresponding to the displayed unique file identifiers) may also be provided.

After displaying the unique file identifiers, flow then passes to step 226 to determine whether the user has selected a particular unique file identifier for further analysis, or whether the user has selected an action to be performed on the previously selected $A_i$ bucket. If the user has selected an action to be performed, then flow passes to step 228, where the chosen action (e.g., removing, renaming, replacing, quarantining, blocking, whitelisting, blacklisting, etc.), as previously described herein, is performed on each program file that is associated with the previously selected $A_i$ bucket.

With reference again to step 226, if the user selects one of the unique program file identifiers, then flow passes to step 230 where additional information related to the selected unique file identifier may be displayed for the user on user interface 172 of console 170. In one example embodiment, a set of one or more unique file paths associated with the selected unique file identifier can be displayed along with, optionally, additional information related to each unique file path. Such additional information may include a frequency count for each unique file path, where each frequency count indicates an aggregate number of hosts associated with the corresponding unique file path. In addition, the ability to select one or more unique file paths for further analysis and the ability to perform an action on all of the program files represented by the previously selected unique file identifier (and corresponding to the displayed unique file paths) may also be provided.

After displaying file path details for the selected unique file identifier in step 230, flow then passes to step 232 to determine whether the user has selected a particular unique program file path for further analysis, or whether the user has selected an action to be performed on all of the program files associated with the selected unique program file identifier. If the user has selected an action to be performed, then flow passes to step 234, such that the chosen action (e.g., removing, renaming, replacing, quarantining, blocking, whitelisting, blacklisting, etc.), as previously described herein, is performed on each program file that is associated with the selected file identifier and that is represented by the last $A_i$ bucket selected by the user.

Referring back to step 232, if the user selects one of the unique program file paths, then flow passes to step 236 where additional information related to the selected unique program file path may be displayed for the user on user interface 172 of console 170. In one example embodiment, a set of one or more unique hosts associated with the selected unique file path can be displayed. In addition, the ability to select one or more of the identified hosts and to select a desired action to be performed on the program files associated with the selected hosts, may also be provided. Flow passes to step 238 where it is determined whether the user has selected one or more hosts and a desired action. If the user selects one or more hosts and a desired action (e.g., removing, renaming, replacing, quarantining, blocking, whitelisting, blacklisting, etc.), as previously described herein, then flow passes to step 240 where the selected action is performed on each of the program files associated with the selected file identifier, the selected unique program file path, and the selected one or more hosts.

In one embodiment, the plurality of program files of the program file inventory, or any subsequent grouping of the plurality of program files, may be manipulated using filters to achieve different results. As an example, filters to remove certain frequency ranges, counts, file identifiers, file paths, and/or hosts, may be utilized where appropriate and based on particular needs. Filters may also be used on arbitrary program file attributes to provide a new view of the results from a previous selection. Such filters may be selectable by the user or preconfigured in the system.

Figure 9:
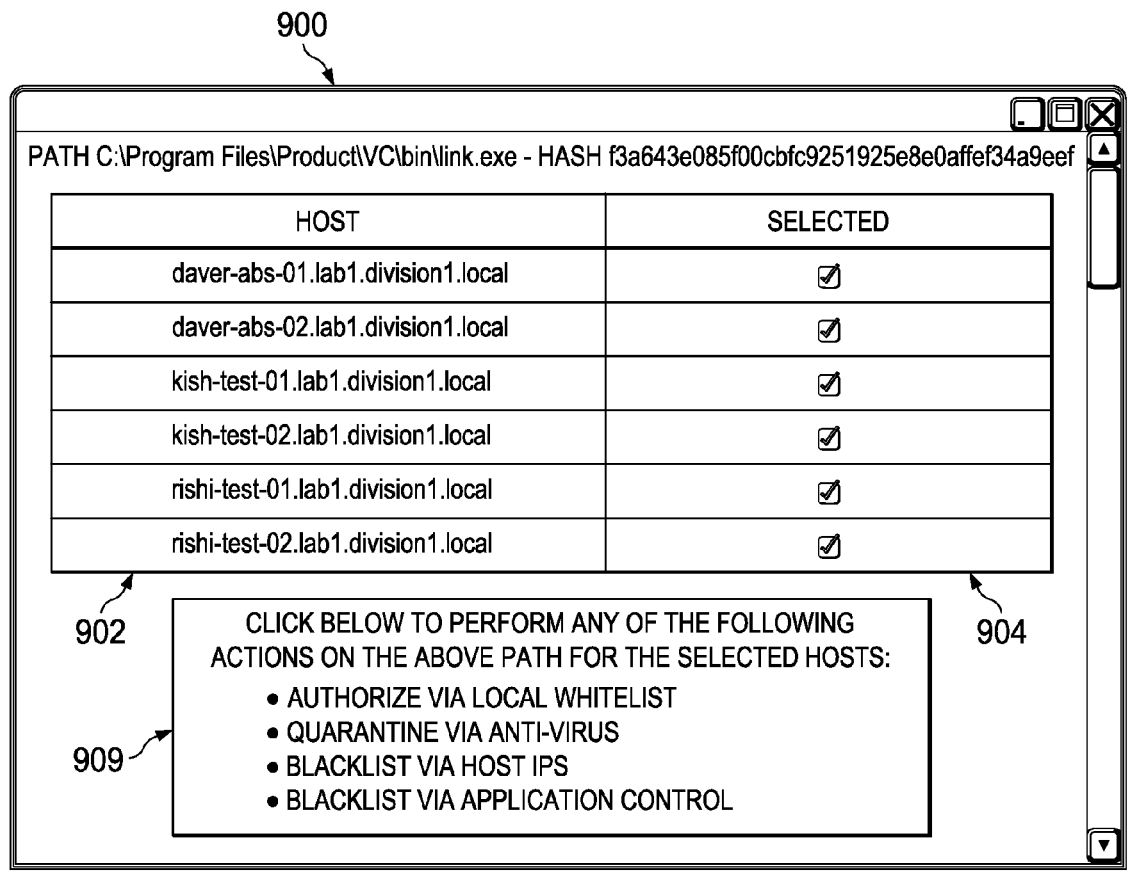

Turning to FIGS. 3 through 9, example screen displays of one embodiment of system 100 are shown. FIGS. 3 through 9 illustrate the processing of an example unknown program file inventory by the successive selection of a frequency range (FIG. 3), a vendor (FIG. 4), a product (FIG. 5), a product version (FIG. 6), a unique file identifier (FIG. 7), a unique program file path (FIG. 8), and unique hosts (FIG. 9). The attribute values for vendor, product, and product version in this example scenario are generically indicated as Vendor A, B, and C, Products A, B, and C, and Product Versions 8.0, 9.0, and 10.0 in FIGS. 3-9. Note that the following description with reference to FIGS. 3-9 will reference FIG. 1 and FIGS. 2A and 2B to describe various processing flows and example network elements that may be used in this example scenario.

Figure 3:
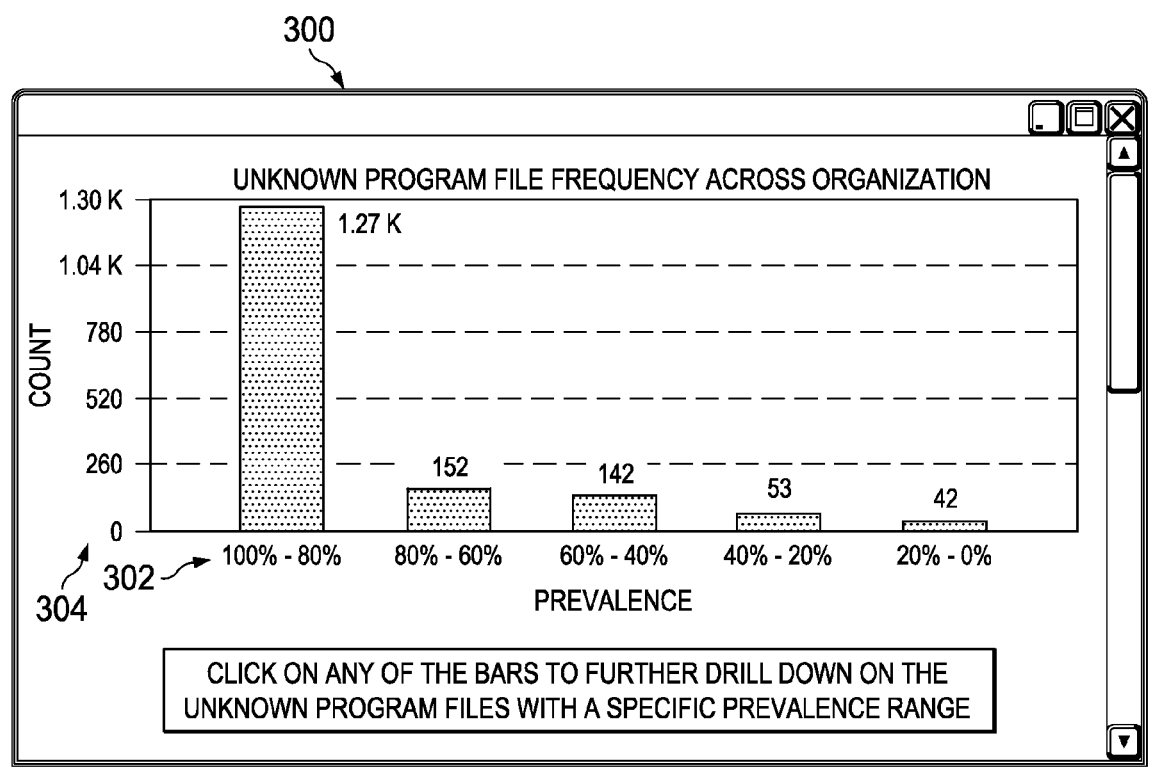
FIGS. 3-9 are exemplary screenshots associated with an example scenario in one example implementation of the system in accordance with the present disclosure.
Figure 4:
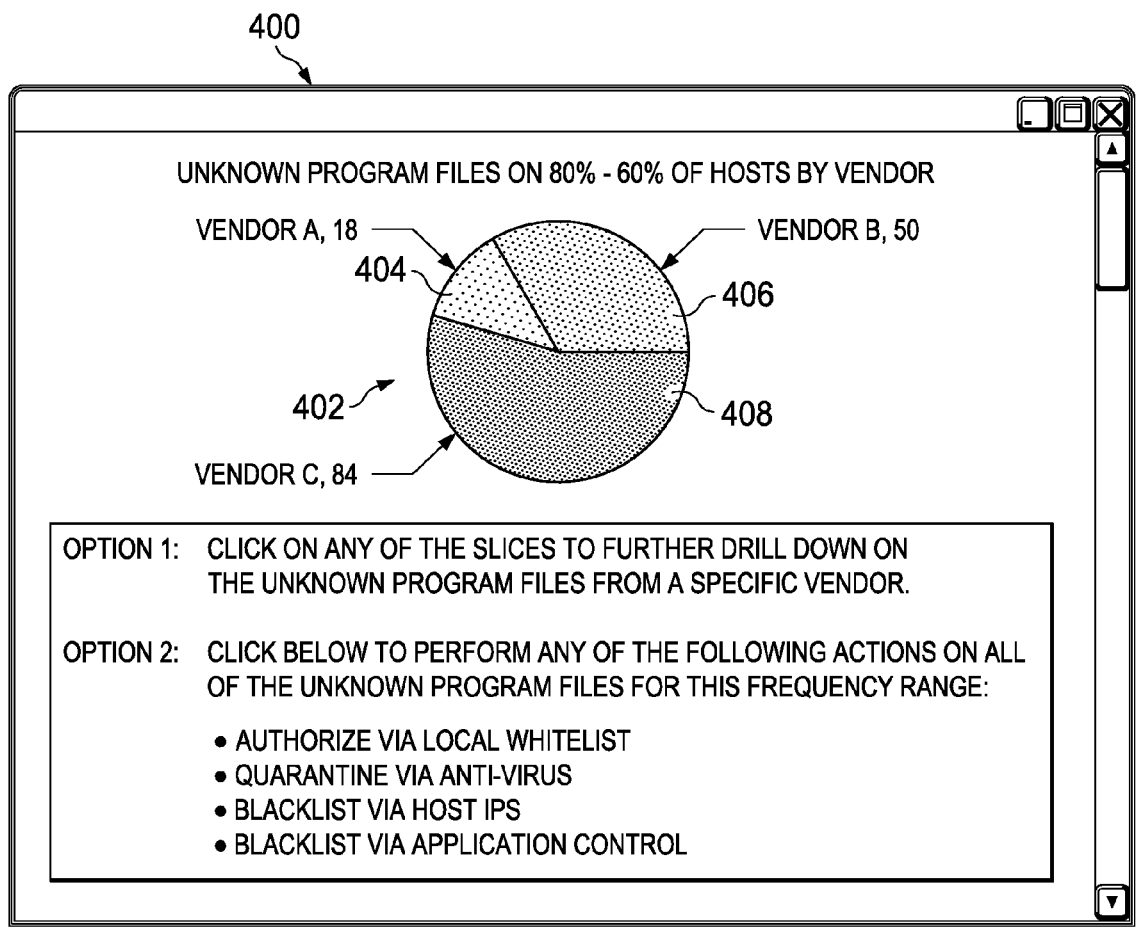
Figure 5:
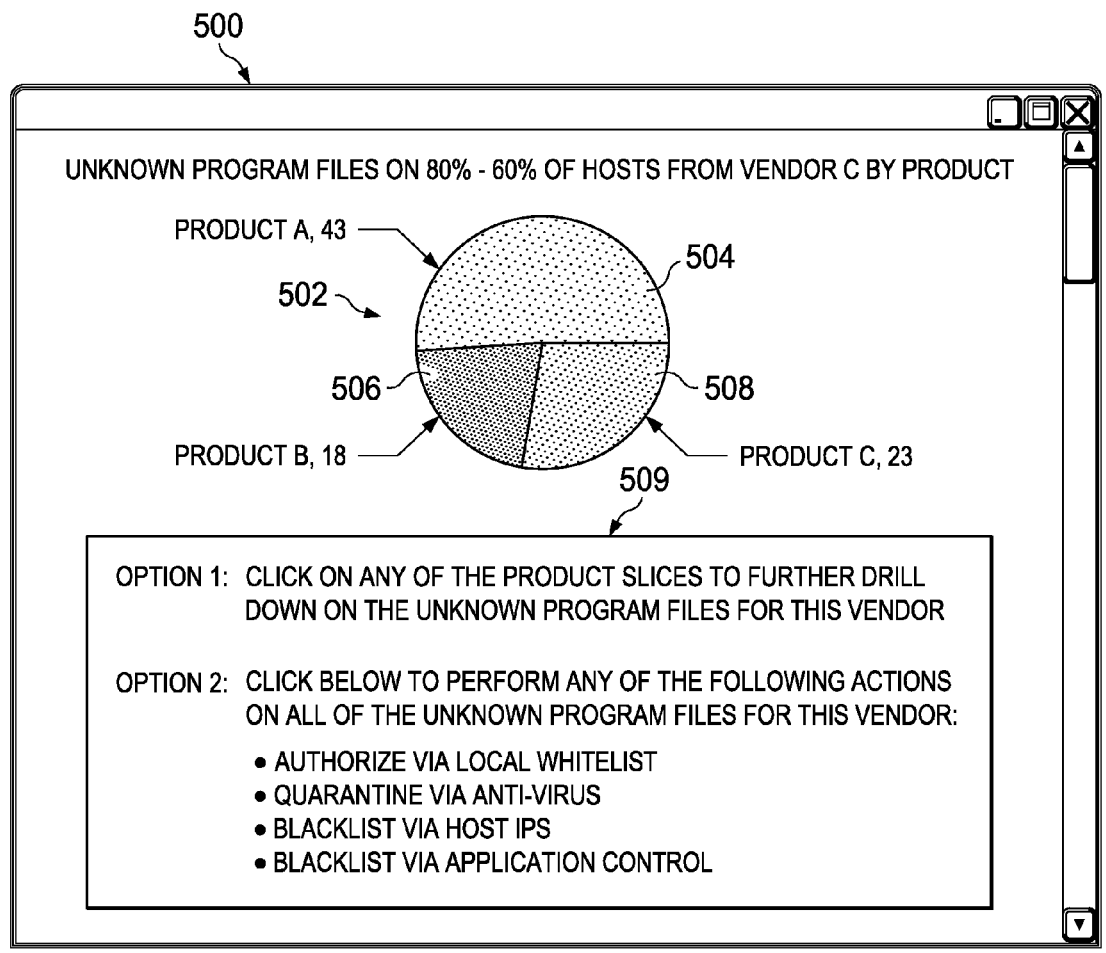
Figure 6:
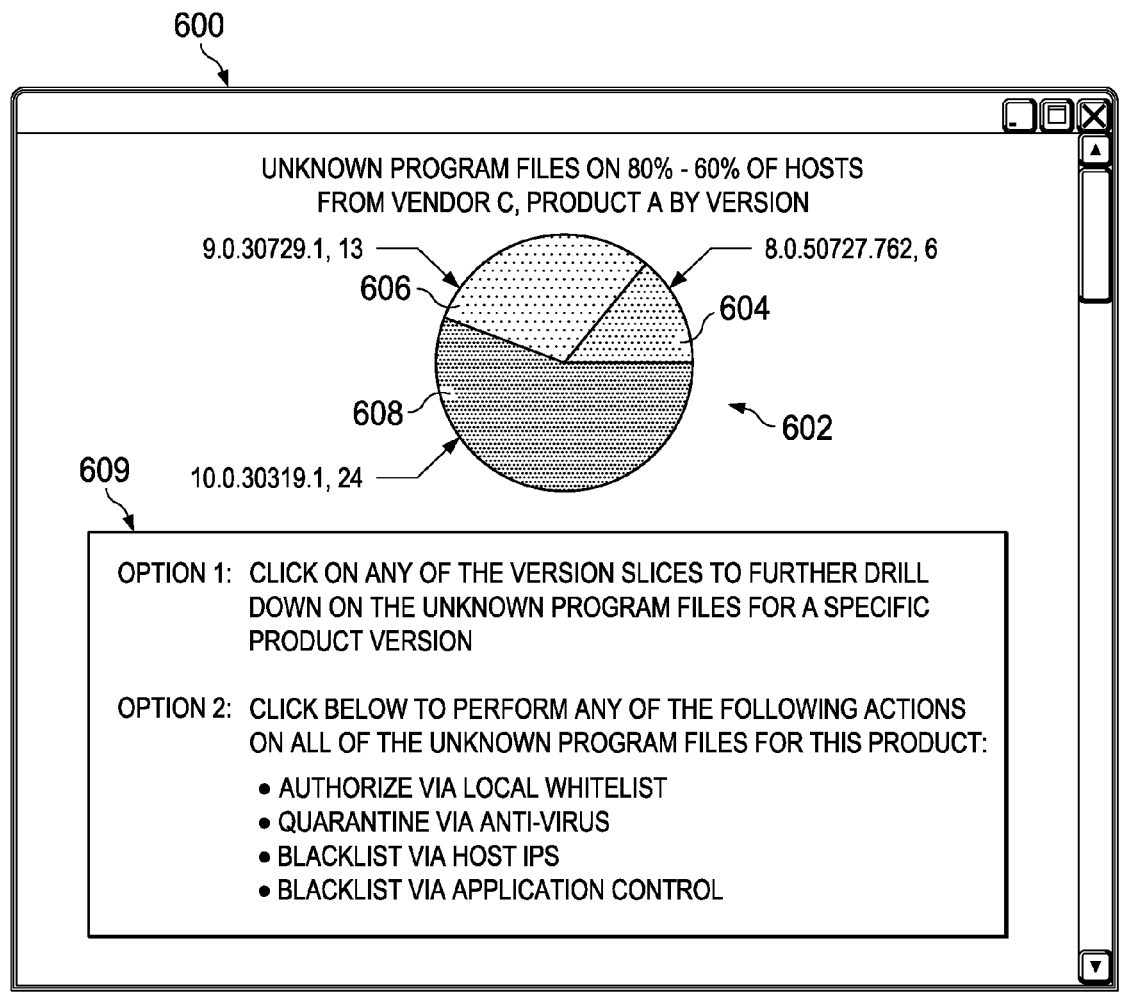
Figure 7:
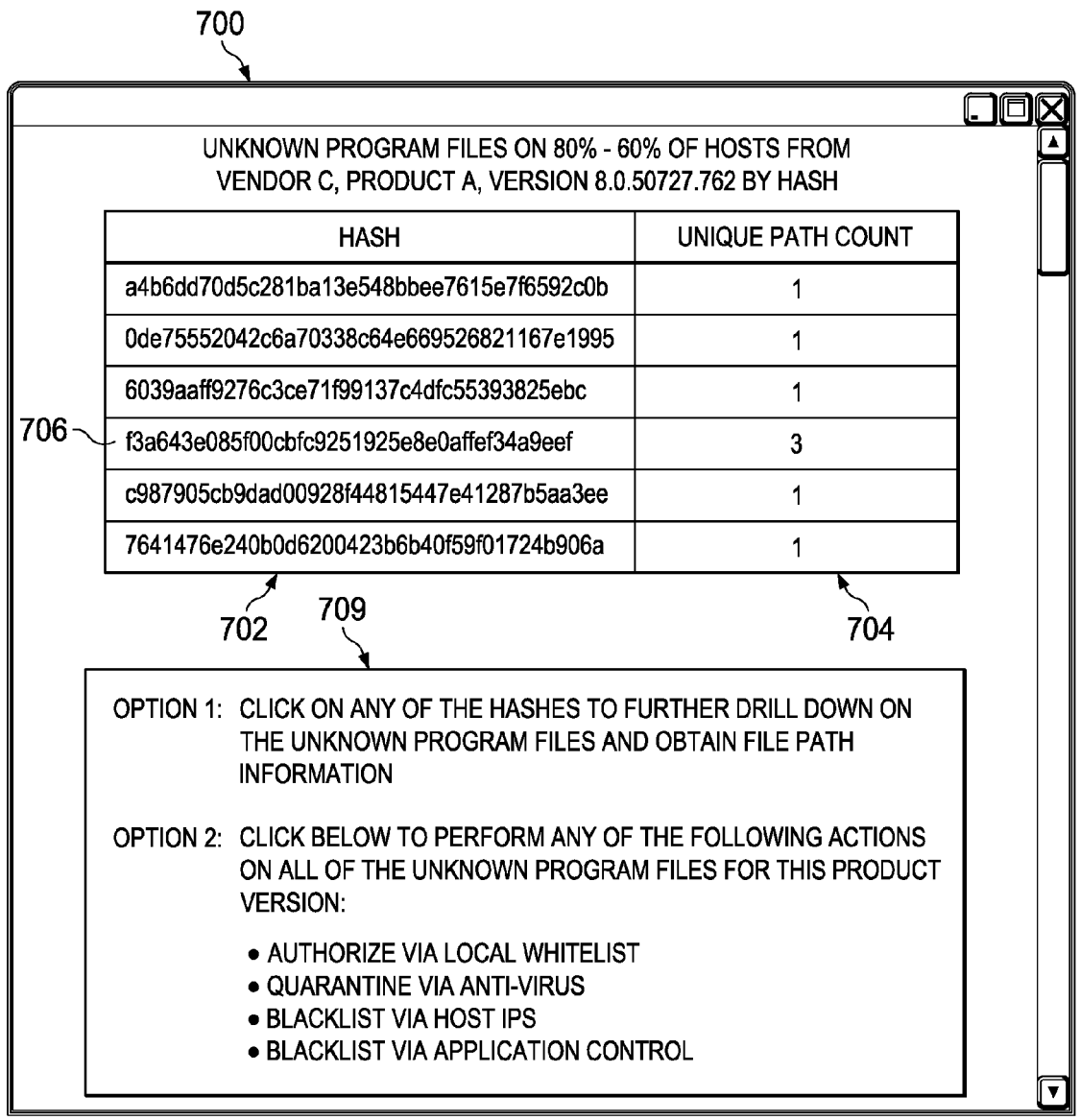
Figure 8:
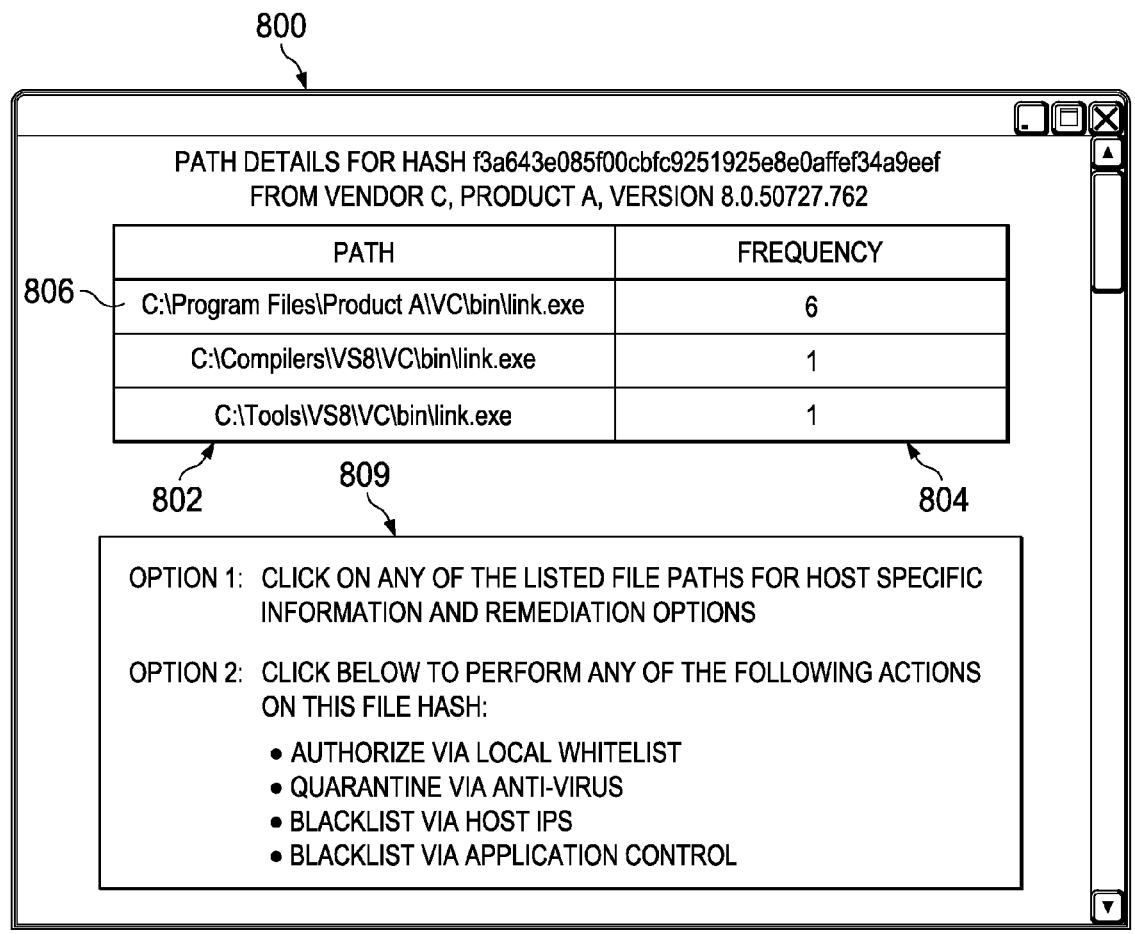

In one embodiment, screen displays shown in FIGS. 3-9 may be provided on user interface 172 of console 170, for an authorized user to evaluate a program file inventory and make appropriate selections based on particular needs. Initially, a frequency analysis may be performed on program file inventory 180, which may identify a desired set of program files, such as unknown program files in hosts 110 of the network. FIG. 3 illustrates an example screen display 300 of frequency ranges of the unknown program files. In screen display 300, a bar graph illustrates program file counts 304 bucketed by a plurality of frequency ranges 302. In this example, five frequency ranges (i.e., 0-20%, 20-40%, 40-60%, 60-80%, and 80-100%) are shown, which indicate the prevalence of the unknown program files on hosts 110 within the network of FIG. 1. In accordance with this example scenario, a subset (i.e., 152 program files) of the plurality of program files of program file inventory 180 were found on 60-80% of hosts 110. As previously discussed herein, however, other frequency measures may be used in the frequency analysis (e.g., prevalence in business units, geographical locations, etc.).

From screen display 300, a user may use input mechanism 174 to select a particular frequency range (e.g., using a mouse to click on a bar associated with a particular frequency range). In this example scenario, the 60-80% frequency range is selected, having a program file count of 152. Once the 60-80% frequency range is selected, screen display 400 of FIG. 4 may be displayed on user interface 172 providing information on the subset of all unknown program files on 60-80% of hosts, bucketed by a first (primary) file attribute $A_1$: vendor. The subset is bucketed by specific vendors associated with the program files. A vendor pie chart 402 displays the bucketing results with three vendor buckets: Vendor A bucket 404 having a count of 18, Vendor B bucket 406 having a count of 50, and Vendor C bucket 408 having a count of 84. Each of the three vendor buckets represents a respective vendor grouping of program files. Options box 409 provides two options to the user: Option 1 allows the user to select a particular vendor bucket to further analyze the respective vendor grouping of program files, or Option 2 allows the user to select an action to be performed on all of the program files in the selected subset of program files (e.g., the program files in the selected 60-80% frequency range).

From screen display 400, a user may use input mechanism 174 to select a particular vendor bucket (e.g., using a mouse to click on a bucket or pie slice corresponding to Vendor A, Vendor B, or Vendor C). In this example scenario, Vendor C bucket 408 is selected, having a program file count of 84. Once Vendor C bucket 408 is selected, screen display 500 of FIG. 5 may be displayed on user interface 172 providing information for all unknown program files on 60-80% of hosts that are associated with Vendor C and bucketed by a second (secondary) file attribute $A_2$: product. Thus, the Vendor C grouping of program files represented by the Vendor C bucket 408 is bucketed by specific products associated with the program files. A product pie chart 502 displays the bucketing results with three product buckets: Product A bucket 504 having a count of 43, Product B bucket 506 having a count of 18, and Product C bucket 508 having a count of 23. Each of the three product buckets represents a respective product grouping of program files. Options box 509 provides two options to the user: Option 1 allows the user to select a particular product bucket to further analyze the respective product grouping of program files, or Option 2 allows the user to select an action to be performed on all of the program files in the selected Vendor C grouping of program files.

From screen display 500, a user may use input mechanism 174 to select a particular product bucket (e.g., using a mouse to click on a bucket or pie slice corresponding to a particular product). In this example scenario, Product A bucket 504 is selected, having a program file count of 43. Once Product A bucket 504 is selected, screen display 600 of FIG. 6 may be displayed on user interface 172 providing information for all unknown program files on 60-80% of hosts, that are associated with Vendor C and Product A, and bucketed by a third (tertiary) file attribute $A_3$: product version. Thus, the Product A grouping of program files represented by Product A bucket 504 is bucketed by specific product versions associated with the program files. In this example scenario, product version pie chart 602 displays the bucketing results with three product version buckets: Product Version 8.0 bucket 604 having a count of 6, Product Version 9.0 bucket 606 having a count of 13, and Product Version 10.0 bucket 608 having a count of 24. Each of the three product version buckets represents a respective product version grouping of program files. Options box 609 provides two options to the user: Option 1 allows the user to select a particular product version bucket to further analyze the respective product version grouping of program files, or Option 2 allows the user to select an action to be performed on all of the program files in the selected Product A grouping of program files.

From screen display 600, a user may use input mechanism 174 to select a particular product version bucket (e.g., using a mouse to click on a bucket or pie slice corresponding to a particular product version). In this example scenario, the Product Version 8.0 bucket 604 is selected, having a program file count of 6. In this example scenario, only three file attributes (i.e., vendor, product, and product version) are used to analyze and bucket the unknown program files. Therefore, once Product Version 8.0 bucket 604 is selected, screen display 700 of FIG. 7 may be displayed on user interface 172 providing unique program file identifiers (e.g., hashes) for all unknown program files on 60-80% of hosts that are associated with Vendor C, Product A, and Product Version 8.0. Thus, a file identifier is determined for each program file in the Product Version 8.0 grouping of program files represented by Product Version 8.0 bucket 604. An identifier list 702 of unique program file identifiers may be displayed with a corresponding count list 704 of unique path counts for each program file identifier. Options box 709 provides two options to the user: Option 1 allows the user to select a particular unique file identifier to obtain further information about the program files associated with the selected unique program file identifier, or Option 2 allows the user to select an action to be performed on all of the program files in the selected Product Version 8.0 grouping of program files.

From screen display 700, a user may use input mechanism 174 to select a particular unique program file identifier (e.g., using a mouse to click on a particular program file identifier). In this example scenario, program file identifier 706 (i.e., Hash f3a643e085f00cbfc9251925e8e0affef34a9eef) is selected, and has a corresponding unique path count of 3. Once program file identifier 706 is selected, screen display 800 of FIG. 8 may be displayed on user interface 172 providing unique program file paths associated with program file identifier 706, which is on 60-80% of hosts and associated with Vendor C, Product A, and Product Version 8.0. A path list 802 of unique file paths may be displayed with a corresponding frequency list 804 indicating the frequency of each unique program file path found on hosts 110. Options box 809 provides two options to the user: Option 1 allows the user to select a particular unique file path to obtain further information about the program files associated with the selected unique file path, or Option 2 allows the user to select an action to be performed on all of the program files represented by the previously selected unique program file identifier 706.

From screen display 800, a user may use input mechanism 174 to select a particular unique file path (e.g., using a mouse to click on a particular program file path). In this example scenario, program file path 806 (i.e., C:\Program Files\Product A\VC\bin\link.exe) is selected, having a corresponding frequency count of 6. Once unique program file path 806 is selected, screen display 900 of FIG. 9 may be displayed on user interface 172 of console 170 providing identification of unique hosts associated with unique program file path 806, which is on 60-80% of hosts and associated with Vendor C, Product A, Product Version 8.0, and unique program file identifier 706. A host list 902 of unique hosts may be displayed with corresponding selection boxes 904. Options box 909 provides the user the ability to select an action to be performed and to select particular ones of the identified hosts by marking corresponding selection boxes 904. The chosen action may be performed on the program files associated with the selected hosts, the selected unique file path 806, and the selected file identifier 706.

FIGS. 3-9 illustrate one embodiment of the processing flow of system 100 for evaluating and remediating unknown program files, in which three file attributes (i.e., vendor, product, and product version) are used to successively group the program files of a selected frequency range. In other embodiments, however, the file attributes used for bucketing may include any intrinsic and/or extrinsic file attributes and any desired number, combination, and order of such file attributes. Thus, for example, two, three, four, or more file attributes may be used each time a selected set of program files is processed, and such file attributes could include either or both extrinsic and intrinsic attributes. In addition, system 100 can be configured to allow a user to select particular file attributes for grouping. For example, from frequency screen 300 and any subsequent file attribute screens (e.g., screens 400 through 600), another option may be provided for the user to select particular file attributes to use for grouping a selected bucket. While the system described herein includes processing in response to user selections, system 100 may also be configured to automatically select particular frequency and count buckets, providing the results of such processing to a user in the form of a screen display, a report, a file, and/or any other suitable mechanism for communication.

Although the embodiments described herein have referred to evaluating unknown program files, it will be apparent that other sets of program files (including known program files) may be evaluated and/or remediated using system 100. For example, it may be useful to evaluate trusted (e.g., whitelisted) program files when trying to determine the pervasiveness of known safe software that is currently not licensed in a particular network. In another example, system 100 could be used to determine a metric indicating how uniformly the known or trusted software is distributed throughout a network, throughout a defined segment of a network, throughout a cluster of computers in a network, and the like. Finally, the options for managing or remediating selected groupings of program files, file identifiers, file paths and/or file hosts, as shown in FIGS. 3-9, are for example purposes only. It will be appreciated that numerous other options, at least some of which are detailed herein in this Specification, may be provided in any combination with or exclusive of the options of FIGS. 3-9.

Software for achieving the grouping and managing operations outlined herein can be provided at various locations (e.g., the corporate IT headquarters, end user computers, distributed servers in the cloud, etc.). In some embodiments, this software could be received or downloaded from a web server (e.g., in the context of purchasing individual end-user licenses for separate networks, devices, servers, etc.) in order to provide this system for selectively grouping and managing program files. In one example implementation, this software is resident in one or more computers sought to be protected from a security attack (or protected from unwanted or unauthorized manipulations of data).

In various embodiments, the software of the system for selectively grouping and managing program files in a computer network environment could involve a proprietary element (e.g., as part of a network security solution with McAfee® ePolicy Orchestrator (ePO) software, McAfee® Anti-Virus software, McAfee® HIPS software, McAfee® Application Control software, etc.), which could be provided in (or be proximate to) these identified elements, or be provided in any other device, server, network appliance, console, firewall, switch, information technology (IT) device, distributed server, etc., or be provided as a complementary solution (e.g., in conjunction with a firewall), or otherwise provisioned in the network.

In certain example implementations, the grouping and managing activities outlined herein may be implemented in software. This could be inclusive of software provided in server 130 (e.g., program grouping module 150, remediation modules 160, etc.) and in other network elements (e.g., hosts 110) including program files to be grouped and managed. These elements and/or modules can cooperate with each other in order to perform the grouping and managing activities as discussed herein. In other embodiments, these features may be provided external to these elements, included in other devices to achieve these intended functionalities, or consolidated in any appropriate manner. For example, some of the processors associated with the various elements may be removed, or otherwise consolidated such that a single processor and a single memory location are responsible for certain activities. In a general sense, the arrangement depicted in FIG. 1 may be more logical in its representation, whereas a physical architecture may include various permutations, combinations, and/or hybrids of these elements.

In various embodiments, some or all of these elements (e.g., server 130, hosts 110) include software (or reciprocating software) that can coordinate, manage, or otherwise cooperate in order to achieve the grouping and managing operations, as outlined herein. One or more of these elements may include any suitable algorithms, hardware, software, components, modules, interfaces, or objects that facilitate the operations thereof. In the implementation involving software, such a configuration may be inclusive of logic encoded in one or more tangible media, which may be inclusive of non-transitory media (e.g., embedded logic provided in an application specific integrated circuit (ASIC), digital signal processor (DSP) instructions, software (potentially inclusive of object code and source code) to be executed by a processor, or other similar machine, etc.).

In some of these instances, one or more memory elements (e.g., memory 134) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, processor 132 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Any of the memory items discussed herein should be construed as being encompassed within the broad term 'memory element.' Similarly, any of the potential processing elements, modules, and machines described in this Specification should be construed as being encompassed within the broad term 'processor.' Each of the computers may also include suitable interfaces for receiving, transmitting, and/or otherwise communicating data or information in a network environment.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of FIG. 1 may be combined in various possible configurations, all of which are clearly within the broad scope of this Specification. In certain cases, it may be easier to describe one or more of the functionalities of a given set of flows by only referencing a limited number of network elements. It should be appreciated that the system of FIG. 1 (and its teachings) is readily scalable and can accommodate a large number of components, as well as more complicated/sophisticated arrangements and configurations. Accordingly, the examples provided should not limit the scope or inhibit the broad teachings of system 100 as potentially applied to a myriad of other architectures.

It is also important to note that the operations described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

What is claimed is:

1. A method, comprising:
determining a plurality of frequency ranges, wherein a particular frequency range corresponds to a proper subset of a plurality of program files, wherein the plurality of program files is associated with a greylist of program files, wherein the proper subset of the plurality of program files is associated with one or more hosts of a plurality of hosts in a network environment, wherein each of the one or more hosts includes at least one occurrence of at least one program file of the proper subset, and wherein the particular frequency range indicates a prevalence of each program file of the proper subset across the plurality of hosts;
receiving an indication that the particular frequency range corresponding to the proper subset is selected;
identifying a plurality of first groupings of the proper subset in response to receiving the indication that the particular frequency range corresponding to the proper subset is selected, wherein a particular first grouping of the plurality of first groupings includes one or more program files of the proper subset based on a value of a primary attribute of the one or more program files included in the particular first grouping;
generating a set of first counts corresponding, respectively, to the plurality of first groupings, wherein a particular first count represents an aggregate amount of program files in the particular first grouping;
receiving an indication that the particular first grouping is selected; and
receiving an indication that an action is selected by a user via a user interface, wherein the action includes blocking execution of at least one program file identified in the particular first grouping, or quarantining the at least one program file identified in the particular first grouping, wherein, if the particular first grouping and the action are selected, the action is performed on the at least one program file identified in the particular first grouping.

2. The method of claim 1, further comprising:
determining a unique identifier corresponding to the at least one program file of the particular first grouping; and
determining a file path count representing an aggregate amount of one or more unique file paths associated with the unique identifier, each of the one or more unique file paths included on at least one of the one or more hosts of the plurality of hosts.

3. The method of claim 2, further comprising:
identifying a first file path of the one or more unique file paths; and
determining a host count representing an aggregate amount of hosts associated with the unique identifier and the first file path.

4. The method of claim 1, further comprising:
identifying a plurality of second groupings from the particular first grouping, wherein a particular second grouping of the plurality of second groupings includes one or more program files of the particular first grouping based on a value of a secondary attribute of the one or more program files included in the particular second grouping; and
generating a set of second counts corresponding, respectively, to the plurality of second groupings, wherein a particular second count represents an aggregate amount of program files in the particular second grouping.

5. An apparatus, comprising:
a program file grouping module;
a memory element for storing a program file inventory of a plurality of program files associated with a plurality of hosts in a network environment; and
a processor operable to execute instructions associated with the program file grouping module and the memory element, including:
determining a plurality of frequency ranges, wherein a particular frequency range corresponds to a proper subset of the plurality of program files, wherein the plurality of program files is associated with a greylist of program files, wherein the proper subset of the plurality of program files is associated with one or more hosts of the plurality of hosts, wherein each of the one or more hosts includes at least one occurrence of at least one program file of the proper subset, and wherein the particular frequency range indicates a prevalence of each program file of the proper subset across the plurality of hosts;
receiving an indication that the particular frequency range corresponding to the proper subset is selected;
identifying a plurality of first groupings of the proper subset in response to receiving the indication that the particular frequency range corresponding to the proper subset is selected, wherein a particular first grouping of the plurality of first groupings includes one or more program files of the proper subset based on a value of a primary attribute of the one or more program files included in the particular first grouping;
generating a set of first counts corresponding, respectively, to the plurality of first groupings, wherein a particular first count represents an aggregate amount of program files of the particular first grouping;
receiving an indication that the particular first grouping is selected; and
receiving an indication that an action is selected by a user via a user interface, wherein the action includes blocking execution of at least one program file identified in the particular first grouping, or quarantining the at least one program file identified in the particular first grouping, wherein, if the particular first grouping and the action are selected, the action is performed on the at least one program file identified in the particular first grouping.

6. The apparatus of claim 5, wherein the primary attribute is one of a vendor, a product, or a version of a product.

7. The apparatus of claim 5, wherein the processor is operable to perform further instructions, comprising:
identifying a plurality of second groupings from the particular first grouping, wherein a particular second grouping of the plurality of second groupings includes one or more program files of the particular first grouping based on a value of a secondary attribute of the one or more program files included in the particular second grouping; and
generating a set of second counts corresponding, respectively, to the plurality of second groupings, wherein a particular second count represents an aggregate amount of program files in the particular second grouping.

8. The apparatus of claim 5, wherein the set of first counts includes a third count representing an aggregate amount of program files in a third grouping of one or more other program files of the particular proper subset,
wherein the third grouping includes the one or more other program files based on a third value of the primary attribute, wherein the first value and the third value are not equivalent, and wherein none of the one or more program files of the first grouping are included in the one or more other program files of the third grouping.

9. One or more non-transitory media that includes code for execution and when executed by a processor is operable to perform operations comprising:
determining a plurality of frequency ranges, wherein a particular frequency range corresponds to a proper subset of a plurality of program files, wherein the plurality of program files is associated with a greylist of program files, wherein the proper subset of the plurality of program files is associated with one or more hosts of a plurality of hosts in a network environment, wherein each of the one or more hosts includes at least one occurrence of at least one program file of the proper subset, and wherein the particular frequency range indicates a prevalence of each program file of the proper subset across the plurality of hosts;
receiving an indication that the particular frequency range corresponding to the proper subset is selected;
identifying a plurality of first groupings of the proper subset in response to receiving the indication that the particular frequency range corresponding to the proper subset is selected, wherein a particular first grouping of the plurality of first groupings includes one or more program files of the proper subset based on a value of a primary attribute of the one or more program files included in the particular first grouping;
generating a set of first counts corresponding, respectively, to the plurality of first groupings, wherein a particular first count represents an aggregate amount of program files in the particular first grouping;
receiving an indication that the particular first grouping is selected; and
receiving an indication that an action is selected by a user via a user interface, wherein the action includes blocking execution of at least one program file identified in the particular first grouping, or quarantining the at least one program file identified in the particular first grouping, wherein, if the particular first grouping and the action are selected, the action is performed on the at least one program file identified in the particular first grouping.

10. The one or more non-transitory media of claim 9, the processor being operable to perform further operations comprising:
generating, in succession, one or more sets of additional counts, each set of additional counts including a respective count representing an aggregate amount of program files of a respective grouping of one or more program files of a respective previous grouping,
wherein each of the respective counts is associated with a distinct value of a different file attribute.

11. The one or more non-transitory media of claim 9, the processor being operable to perform further operations comprising:
determining a unique identifier corresponding to the at least one program file of the particular first grouping; and
determining a file path count representing an aggregate amount of one or more unique file paths associated with the unique identifier, each of the one or more unique file paths included on at least one of the one or more hosts of the plurality of hosts.

12. The one or more non-transitory media of claim 11, the processor being operable to perform further operations comprising:
identifying a first file path of the one or more unique file paths; and
determining a host count representing an aggregate amount of hosts associated with the unique identifier and the first file path.

13. The one or more non-transitory media of claim 12, the processor being operable to perform further operations comprising:
identifying each host associated with the unique identifier and the first file path.

14. The one or more non-transitory media of claim 9, the processor being operable to perform further operations comprising:
providing for display on a user interface the plurality of frequency ranges; and
providing for display on the user interface the set of first counts in response to receiving the indication that the particular frequency range corresponding to the proper subset is selected.

15. The one or more non-transitory media of claim 9, the processor being operable to perform further operations comprising:
identifying a plurality of second groupings from the particular first grouping, wherein a particular second grouping of the plurality of second groupings includes one or more program files of the particular first grouping based on a value of a secondary attribute of the one or more program files included in the particular second grouping; and
generating a set of second counts corresponding, respectively, to the plurality of second groupings, wherein a particular second count represents an aggregate amount of program files in the particular second grouping.

16. The one or more non-transitory media of claim 9, wherein the primary attribute is one of a vendor, a product, or a version of a product.

\* \* \* \* \*